(12) United States Patent
Ide et al.

(10) Patent No.: US 10,103,561 B2
(45) Date of Patent: Oct. 16, 2018

(54) POWER SUPPLY SYSTEM

(71) Applicant: TOYOTA JIDOSHA KABUSHIKI KAISHA, Toyota-shi, Aichi-ken (JP)

(72) Inventors: Akihiko Ide, Okazaki (JP); Koichi Sakata, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 352 days.

(21) Appl. No.: 14/849,642

(22) Filed: Sep. 10, 2015

(65) Prior Publication Data

US 2016/0079751 A1 Mar. 17, 2016

(30) Foreign Application Priority Data

Sep. 11, 2014 (JP) .................. 2014-185458

(51) Int. Cl.
| | |
|---|---|
| *H02J 7/00* | (2006.01) |
| *B60L 3/00* | (2006.01) |
| *B60L 11/18* | (2006.01) |
| *H02M 1/00* | (2006.01) |

(52) U.S. Cl.
CPC ............ *H02J 7/0054* (2013.01); *B60L 3/003* (2013.01); *B60L 3/0092* (2013.01); *B60L 11/1868* (2013.01); *H02M 1/00* (2013.01); *B60L 2210/10* (2013.01); *B60L 2240/547* (2013.01); *H02J 2007/0059* (2013.01)

(58) Field of Classification Search
CPC . B60L 11/1868; B60L 3/0092; B60L 2210/10
See application file for complete search history.

(56) References Cited

U.S. PATENT DOCUMENTS

| | | | |
|---|---|---|---|
| 7,250,810 B1* | 7/2007 | Tsen ...................... | H02M 3/07 315/291 |
| 2010/0164278 A1 | 7/2010 | Oyobe et al. | |
| 2010/0181829 A1* | 7/2010 | Ichikawa ............ | B60L 11/1861 307/9.1 |
| 2010/0318525 A1* | 12/2010 | Mizuguchi ........ | G06F 17/30657 707/748 |
| 2011/0316489 A1 | 12/2011 | Norimatsu et al. | |

(Continued)

FOREIGN PATENT DOCUMENTS

| | | |
|---|---|---|
| CN | 102318176 A | 1/2012 |
| CN | 103516205 A | 1/2014 |

(Continued)

*Primary Examiner* — Thienvu Tran
*Assistant Examiner* — Pinping Sun
(74) *Attorney, Agent, or Firm* — Sughrue Mion, PLLC

(57) ABSTRACT

A power supply system comprises a first battery, a second battery, an output electric circuit, a first switching element, a second switching element, and a third switching element. The output electric circuit includes a first electric circuit and a second electric circuit. The second electric circuit has a potential lower than a potential of the first electric circuit. The first, second and third switching elements are provided in series with each other from the first electric circuit toward the second electric circuit. The first battery is provided in parallel with the second switching element. The second battery is provided in parallel with a series connection between the second switching element and the third switching element.

3 Claims, 29 Drawing Sheets

(56) References Cited

U.S. PATENT DOCUMENTS

| | | | |
|---|---|---|---|
| 2012/0320649 A1* | 12/2012 | Hamanaka | H02M 7/48 363/131 |
| 2013/0134786 A1 | 5/2013 | Ishigaki et al. | |
| 2013/0207470 A1* | 8/2013 | Stoev | H02M 3/158 307/43 |
| 2013/0342151 A1* | 12/2013 | Kurokawa | H02M 7/537 318/500 |
| 2014/0145694 A1* | 5/2014 | Ishigaki | H02J 1/06 323/271 |
| 2014/0343776 A1* | 11/2014 | Ang | H01M 10/4257 701/22 |

FOREIGN PATENT DOCUMENTS

| | | |
|---|---|---|
| EP | 2 773 034 A1 | 9/2014 |
| JP | 2010193588 A | 9/2010 |
| JP | 2012-070514 A | 4/2012 |
| JP | 2014003858 A | 1/2014 |

\* cited by examiner

<S1_ON FAULT, STEP-UP/STEP-DOWN OPERATION, STEP-UP STORAGE & STEP-DOWN DISCHARGE>

| CNV1 | S1: ON FAULT | S2: ON | S3: OFF |
|---|---|---|---|
| CNV2 | S1: OFF | S2: ON | S3: ON |
| LOGICAL SUM | S1: ON FAULT | S2: ON | S3: OFF |

UPPER ARM OFF
LOWER ARM ON

<S2 ON FAULT, STEP-UP/STEP-DOWN OPERATION, STEP-UP STORAGE & STEP-DOWN DISCHARGE>

| | S1: OFF | S2: ON | S3: OFF |
|---|---|---|---|
| CNV1 | S1: OFF | S2: ON FAULT | S3: ON |
| CNV2 | S1: OFF | S2: ON FAULT | S3: ON |
| LOGICAL SUM | | | |

UPPER ARM OFF
LOWER ARM ON

<S1 ON FAULT, STEP-UP/STEP-DOWN OPERATION, STEP-UP STORAGE & STEP-DOWN DISCHARGE>

| CNV1 | S1: ON FAULT | S2: OFF | S3: ON |
|---|---|---|---|
| CNV2 | S1: OFF | S2: ON | S3: ON |
| LOGICAL SUM | S1: ON FAULT | S2: OFF | S3: ON |

UPPER ARM OFF
LOWER ARM ON

⟨S3 ON FAULT, STEP-UP/STEP-DOWN OPERATION, STEP-UP STORAGE & STEP-DOWN DISCHARGE⟩

| CNV1 | S1: OFF | S2: OFF | S3: ON |
|---|---|---|---|
| CNV2 | S1: OFF | S2: ON | S3: ON FAULT |
| LOGICAL SUM | S1: OFF | S2: ON | S3: ON FAULT |

UPPER ARM OFF } LOWER ARM ON

<S3 ON FAULT, STEP-UP/STEP-DOWN OPERATION, STEP-UP DISCHARGE & STEP-DOWN STORAGE>

⟨B1 SINGLE DIRECT CONNECTION⟩

| | CNV1 | CNV2 | S3: OFF FIX |
|---|---|---|---|
| UPPER ARM, ON FIX | S1: ON FIX Or ON FAULT | S2: ON FIX Or ON FAULT | S3: OFF FIX |
| LOWER ARM, OFF FIX | S1: ON | S2: OFF | S3: OFF |
| LOGICAL SUM | S1: ON FIX Or ON FAULT | S2: ON FIX Or ON FAULT | S3: OFF FIX |

POWER SUPPLY SYSTEM

INCORPORATION BY REFERENCE

The disclosure of Japanese Patent Application No. 2014-185458 filed on Sep. 11, 2014 including the specification, drawings and abstract is incorporated herein by reference in its entirety.

BACKGROUND OF THE INVENTION

1. Field of the Invention

The present invention relates to a power supply system in which voltage conversion is performed bidirectionally between either or both of two batteries and an output electric circuit.

2. Description of Related Art

A hybrid vehicle and an electric vehicle that employ a rotary electric machine as a driving source are provided with a power supply system including a battery, which is a direct-current power supply, and a voltage transducer for stepping up a battery voltage and stepping down a regenerative electric power caused by the rotary electric machine. As the voltage transducer, there has been known a buck-boost converter as illustrated in FIG. 28. The buck-boost converter steps up/down a voltage by ON/OFF operations of two switching elements S1, S2.

Further, as a voltage transducer having an expanded function of the buck-boost converter, Japanese Patent Application Publication No. 2012-070514 (JP 2012-070514 A), for example, describes a voltage transducer including four switching elements S1 to S4 and connected to two batteries B1, B2, as illustrated in FIG. 29. The voltage transducer can step up/down a voltage by ON/OFF operations of the four switching elements S1 to S4, and can switch the two batteries between series connection and parallel connection by changing ON-OFF patterns of the switching elements.

In the meantime, in a conventional voltage transducer, it is difficult to perform voltage conversion at the time of an ON fault (short-circuit fault) of a switching element. For example, in a buck-boost converter illustrated in FIG. 28, as generally known, a voltage is stepped up/down by an ON/OFF operation of a switching element S2 in synchronization with an ON/OFF operation of a switching element S1. Accordingly, when either one of the switching elements S1, S2 has an ON fault and is turned on continuously, a voltage cannot be stepped up/down in the above manner.

In the voltage transducer illustrated in FIG. 29, even if either of the switching elements S1 to S4 has an ON fault, a voltage can be stepped up/down theoretically by use of either of the batteries B1, B2. However, in this case, another problem is caused such that the stepping up/down of a voltage should be stopped from the viewpoint of safety. For example, at the time of an ON fault of the switching element S3, the battery B1 is connected in series with the battery B2, so that an output voltage is a voltage sum of the battery B1 and the battery B2. This voltage might exceed withstanding voltages of system main relays SMR1, SMR2, and the like, so the voltage transducer illustrated in FIG. 29 eventually cannot help but stop the stepping up/down of a voltage at the time of an ON fault of the switching element.

SUMMARY OF THE INVENTION

The present invention provides a power supply system that can perform voltage conversion even at the time of an ON fault of a switching element.

A power supply system related an aspect of the present invention includes a first battery, a second battery, an output electric circuit, a first switching element, a second switching element, and a third switching element. The output electric circuit is configured to perform voltage conversion bidirectionally with either one or both of the first battery and the second battery. The output electric circuit includes a first electric circuit and a second electric circuit. The second electric circuit has a potential lower than a potential of the first electric circuit. The first switching element, the second switching element, and the third switching element are provided in series with each other from the first electric circuit toward the second electric circuit. The first battery is provided in parallel with the second switching element. The second battery is provided in parallel with a series connection between the second switching element and the third switching element.

According to the power supply system of the present invention, it is possible to perform voltage conversion even at the time of an ON fault of a switching element The power supply system may further includes a first system main relay, a second system main relay and a controlling portion. The first system main relay may be configured such that the first battery is connected in parallel with the second switching element via the first system main relay. The second system main relay may be configured such that the second battery is connected in parallel with the series connection between the second switching element and the third switching element via the second system main relay. The controlling portion may be configured to perform ON-OFF controls on the first switching element, the second switching element, the third switching element, the first system main relay and the second system main relay. The controlling portion may be configured to, at a time of an ON fault of the first switching element, turn off the second system main relay and execute a first failsafe mode by performing ON-OFF controls on the second switching element and the third switching element. The controlling portion may be configured to step up a voltage of the first battery in the first failsafe mode.

The power supply system may further includes a first system main relay, a second system main relay and a controlling portion. The first system main relay may be configured such that the first battery is connected in parallel with the second switching element via the first system main relay. The second system main relay may be configured such that the second battery is connected in parallel with the series connection between the second switching element and the third switching element via the second system main relay. The controlling portion may be configured to perform ON-OFF controls on the first switching element, the second switching element, the third switching element, the first system main relay and the second system main relay. The controlling portion may be configured to, at a time of an ON fault of the second switching element, turn off the first system main relay and execute a second failsafe mode by performing ON-OFF controls on the first switching element and the third switching element. The controlling portion may be configured to step up a voltage of the second battery in the second failsafe mode.

Furthermore, the second battery may have a voltage higher than a voltage of the first battery. The first battery and the second battery may be placed in a loop circuit via the third switching element. The controlling portion may be configured to control connection or disconnection between the first battery and the second battery by performing an ON-OFF control on the third switching element.

The controlling portion may be configured to control a charging current by adjusting a conduction resistance of the third switching element, when an electric power is supplied to the first battery from the second battery by connecting the first battery to the second battery.

A power supply system related to the other aspect of the present invention includes a first battery, a second battery, an output electric circuit, a first switching element, a second switching element, and a third switching element. The output electric circuit is configured to perform voltage conversion bidirectionally with either one or both of the first battery and the second battery. The output electric circuit includes a first electric circuit and a second electric circuit. The second electric circuit has a potential lower than a potential of the first electric circuit. The first switching element, the second switching element, and the third switching element are provided in series with each other from the first electric circuit toward the second electric circuit. The first battery is provided in parallel with the third switching element. The second battery is provided in parallel with a series connection between the second switching element and the third switching element.

The power supply system may further includes a first system main relay, a second system main relay and a controlling portion. The first system main relay is configured such that the first battery is connected in parallel with the third switching element via the first system main relay. The second system main relay is configured such that the second battery is connected in parallel with the series connection between the second switching element and the third switching element via the second system main relay. The controlling portion may be configured to perform ON-OFF controls on the first switching element, the second switching element, the third switching element, the first system main relay and the second system main relay. The controlling portion may be configured to, at a time of an ON fault of the first switching element, turn off the second system main relay and execute a first failsafe mode by performing ON-OFF controls on the second switching element and the third switching element. The controlling portion may be configured to step up a voltage of the first battery in the first failsafe mode.

The power supply system may further includes a first system main relay, a second system main relay and a controlling portion. The first system main relay imay be configured such that the first battery is connected in parallel with the third switching element via the first system main relay. The second system main relay may be configured such that the second battery is connected in parallel with the series connection between the second switching element and the third switching element via the second system main relay. The controlling portion may be configured to perform ON-OFF controls on the first switching element, the second switching element, the third switching element, the first system main relay and the second system main relay. The controlling portion may be configured to, at a time of an ON fault of the third switching element, turn off the first system main relay and execute a second failsafe mode by performing ON-OFF controls on the first switching element and the second switching element. The controlling portion may be configured to step up a voltage of the second battery in the second failsafe mode.

Furthermore, the second battery may have a voltage higher than a voltage of the first battery. The first battery and the second battery may be placed in a loop circuit via the second switching element. The controlling portion may be configured to control connection or disconnection between the first battery and the second battery by controlling ON-OFF of the second switching element.

The controlling portion may be configured to control a charging current by adjusting a conduction resistance of the second switching element, when an electric power is supplied to the first battery from the second battery by connecting the first battery to the second battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
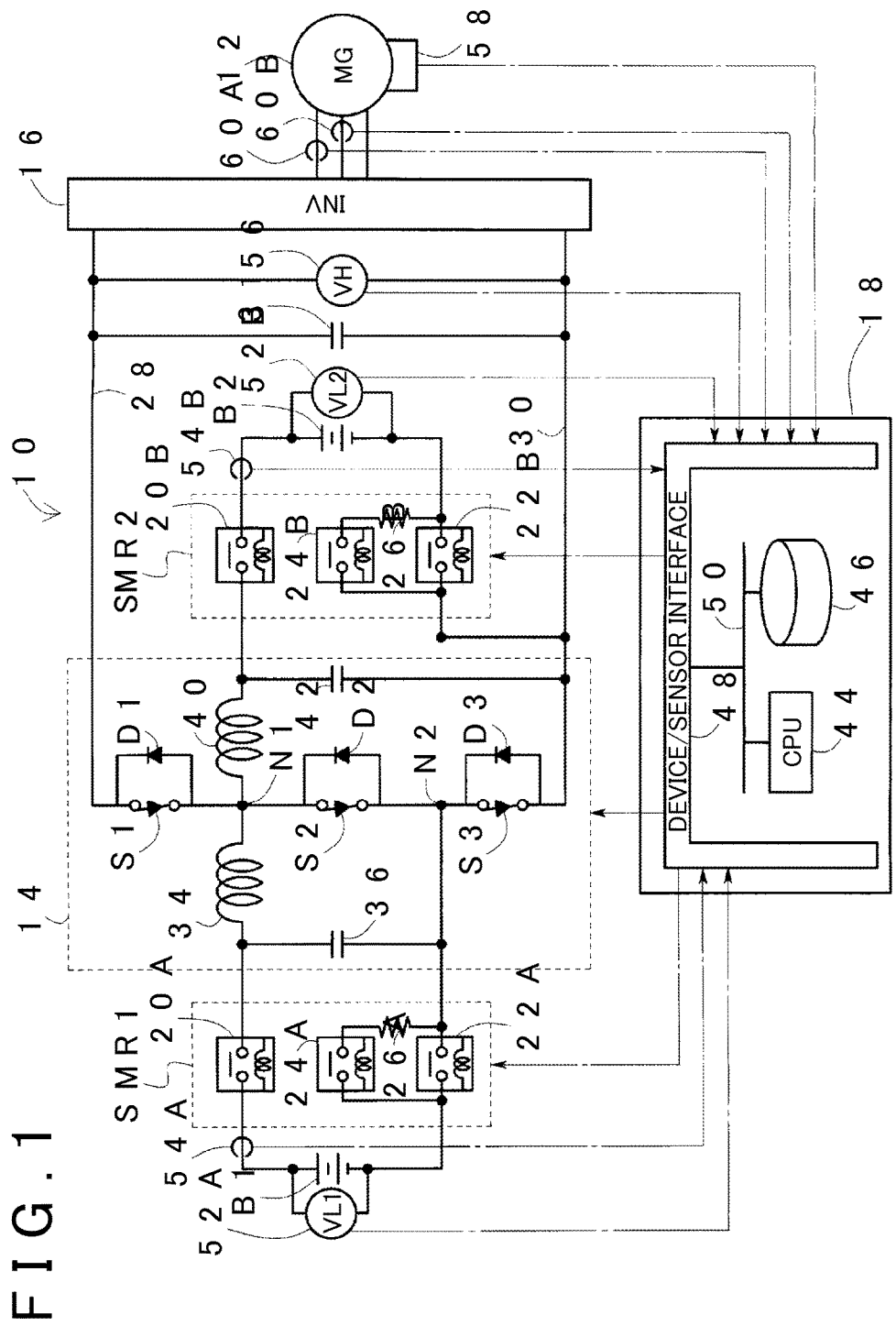
FIG. 1 is a configuration diagram of an electric system of a vehicle which electric system includes a power supply system according to the present embodiment.

With reference to the drawings, the following describes an embodiment of the present invention. FIG. 1 exemplifies a configuration diagram of an electric system of a vehicle which electric system includes a power supply system 10 according to the present embodiment. Note that an alternate long and short dash line in FIG. 1 indicates a signal line.

The power supply system 10 is an electric power supply for a rotary electric machine 12 serving as a drive source of a vehicle. A vehicle in which the power supply system 10 is provided is constituted by a hybrid vehicle or an electric vehicle, for example. The power supply system 10 includes a first battery B1, a second battery B2, a voltage transducer 14, an inverter 16, system main relays SMR1, SMR2, and a controlling portion 18.

As illustrated in FIG. 1, the first battery B1 and the second battery B2 are connected to the voltage transducer 14. The voltage transducer 14 steps up direct voltages VL1, VL2 from the first battery B1 and the second battery B2, and outputs them to the inverter 16.

The inverter 16 is constituted by a three-phase inverter, and is connected to the rotary electric machine 12. The inverter 16 converts a direct-current power stepped up by the voltage transducer 14 into a three-phase alternating-current power, and outputs it to the rotary electric machine 12. Hereby, the rotary electric machine 12 is rotationally driven. A driving force of the rotary electric machine 12 is transmitted to driving wheels (not shown).

Further, at the time of braking of the vehicle, regenerative braking is performed by the rotary electric machine 12. A regenerative electric power obtained at this time is subjected to AC/DC conversion performed by the inverter 16 so as to be converted into a direct-current power, and the direct-current power is then stepped down by the voltage transducer 14 so as to be supplied to the first battery B1 and the second battery B2.

The controlling portion 18 controls step-up/step-down (voltage conversion) of a direct voltage by controlling ON/OFF of switching elements S1, S2, S3 of the voltage transducer 14. Further, the controlling portion 18 controls DC/AC conversion and AC/DC conversion by controlling ON/OFF of a switching element (not shown) of the inverter 16. Through the controls on the voltage transducer 14 and the inverter 16, the controlling portion 18 controls driving of the rotary electric machine 12.

The first battery B1 and the second battery B2 are direct-current power supplies each constituted by a secondary battery, and are each constituted by a lithium-ion storage battery or a nickel metal hydride storage battery, for example. Further, at least one of the first battery B1 and the second battery B2 may be a storage element such as an electric double layer capacitor, instead of the secondary battery. Further, as will be described later, respective battery voltages of the first battery B1 and the second battery B2 are managed so that a voltage VL2 of the second battery B2 is higher than a voltage VL1 of the first battery B1.

The first battery B1 is connected in parallel with the switching element S2 of the voltage transducer 14 via the system main relay SMR1. Further, the second battery B2 is connected in parallel with the switching elements S2 and S3 of the voltage transducer 14 via the system main relay SMR2.

The system main relays SMR1, SMR2 each include three types of relays. That is, positive relays 20A, 20B are connected to respective positive sides of the batteries B1, B2, and negative relays 22A, 22B are connected to respective negative sides thereof. Further, as a configuration to prevent rush current at the time when the first battery B1 and the second battery B2 are connected to a circuit, precharge relays 24A, 24B are connected in parallel with the negative relays 22A, 22B. Resistors 26A, 26B are connected in series with the precharge relays 24A, 24B, respectively.

The voltage transducer 14 performs ON/OFF operations on the switching elements S1, S2, S3, so as to perform voltage conversion bidirectionally from the first battery B1 and the second battery B2 to output electric circuits 28, 30 (and the rotary electric machine 12 as their destinations) and vice versa.

Figure 2:
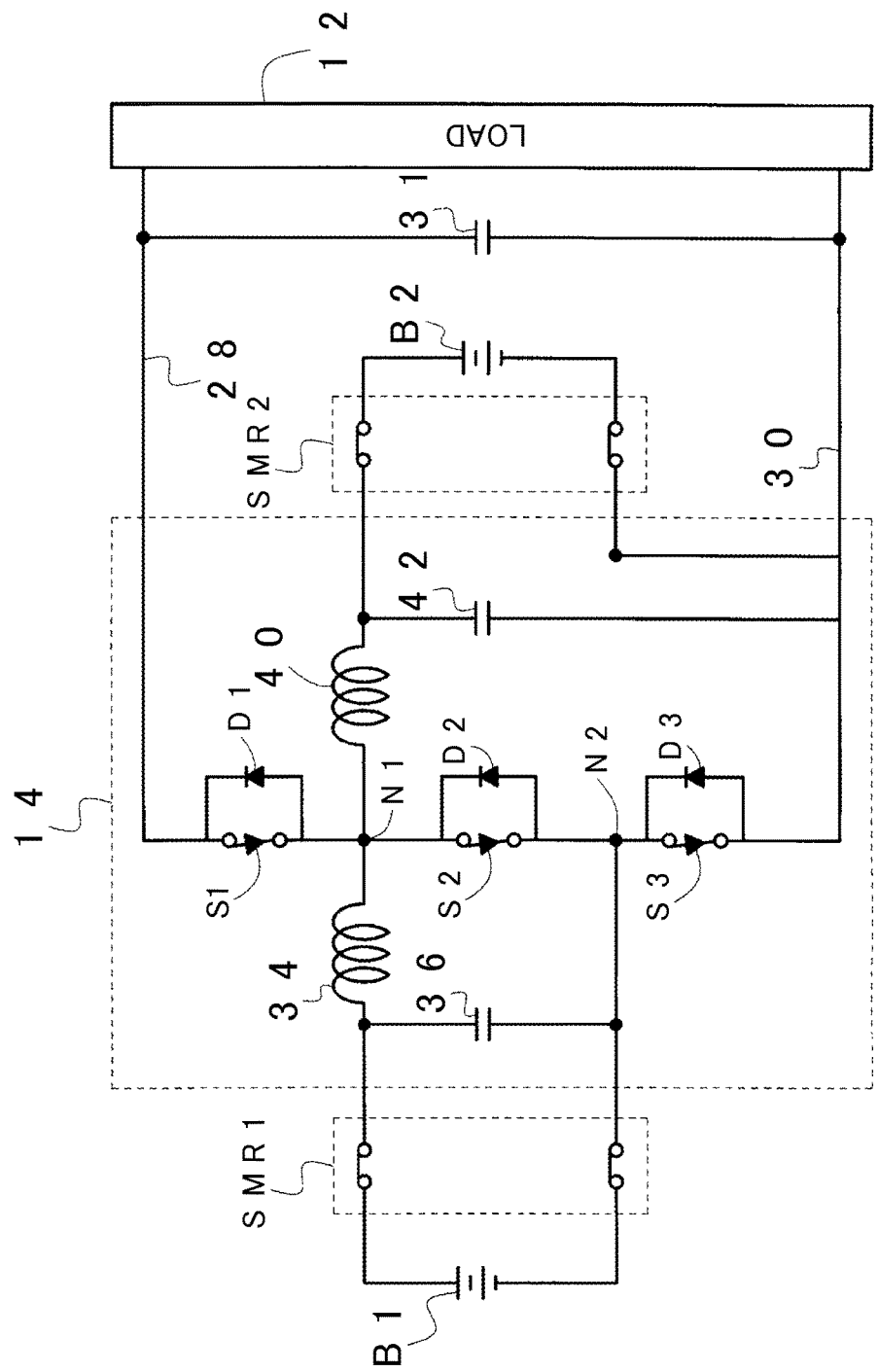
FIG. 2 is a configuration diagram of the power supply system according to the present embodiment.

FIG. 2 exemplifies an extracted view of the voltage transducer 14 and its peripherals. The output electric circuits 28, 30 constituting an output of the voltage transducer 14 are connected to a load such as the rotary electric machine 12. The output electric circuits 28, 30 are constituted by a high-voltage electric circuit 28, which is a first electric circuit, and a reference electric circuit 30, which is a second electric circuit with a potential lower than that of the high-voltage electric circuit 28. A smoothing capacitor 31 is provided in parallel with the load between the high-voltage electric circuit 28 and the reference electric circuit 30.

The voltage transducer 14 is provided with the first, second, third switching elements S1, S2, S3 in series from the high-voltage electric circuit 28 toward the reference electric circuit 30. The switching elements S1, S2, S3 are each constituted by, for example, an IGBT (an insulated gate bipolar transistor). The switching elements S1, S2, S3 are each provided so that a forward current direction between its collector and its emitter is the same as a direction from a high-voltage side to a low-voltage side, that is, a direction from the high-voltage electric circuit 28 to the reference electric circuit 30.

In the voltage transducer 14, diodes D1, D2, D3 are connected in reverse-parallel to the switching elements S1, S2, S3, respectively. That is, each of the diodes D1, D2, D3 is provided so as to flow a current from the reference electric circuit 30 to the high-voltage electric circuit 28.

In general, a set of a switching element and a diode connected in reverse-parallel thereto is referred to as an arm. In the present embodiment, a set of the switching element S1 and the diode D1, a set of the switching element S2 and the diode D2, and a set of the switching element S3 and the diode D3 constitute respective arms.

Further, the voltage transducer 14 is provided with a first reactor 34 connected in series with the first battery B1, and a first capacitor 36 connected in parallel with the first battery B1. Similarly, the voltage transducer 14 is provided with a second reactor 40 connected in series with the second battery B2, and a second capacitor 42 connected in parallel with the second battery B2.

The voltage transducer 14, the first battery B1, and the second battery B2 are connected in the following manner. That is, a positive electrode of the first battery B1 is connected to a first node N1 between the switching elements S1 and S2 of the voltage transducer 14 via the first reactor 34, and a negative electrode of the first battery B1 is connected to a second node N2 between the switching elements S2 and S3. A positive electrode of the second battery B2 is connected to the first node N1 via the second reactor 40, and a negative electrode of the second battery B2 is connected to the reference electric circuit 30.

Referring back to FIG. 1, the controlling portion 18 performs various operation controls of the vehicle, including voltage conversion to the voltage transducer 14 and the inverter 16, as will be described later. The controlling portion 18 may be constituted by a computer such that a CPU 44, a storage portion 46, and a device/sensor interface 48 are connected to each other via an internal bus 50.

The controlling portion 18 receives signals from various sensors via the device/sensor interface 48. More specifically, as signals related to the first battery B1 and the second battery B2, the controlling portion 18 receives respective detection values from battery voltage sensors 52A, 52B for measuring voltage values VL1, VL2 of respective batteries, battery current sensors 54A, 54B for measuring current values IB1, IB2 of respective batteries, and an output voltage sensor 56 for measuring output voltage values VH in the output electric circuits 28, 30.

Further, the controlling portion 18 receives detection signals of a rotation angle and a three-phase alternating current of the rotary electric machine 12 from a resolver 58 and current sensors 60A, 60B, as signals related to the rotary electric machine 12. Further, the controlling portion 18 receives detection signals of stepping-in amounts of respective pedals from an accelerator pedal stepping-in amount sensor and a brake pedal stepping-in amount sensor (not shown) as other vehicle information.

Further, the controlling portion 18 supplies control signals to the switching elements S1, S2, S3 of the voltage transducer 14 and the switching element of the inverter 16 via the device/sensor interface 48. The CPU 44 of the controlling portion 18 executes various control programs stored in the storage portion 46, and performs arithmetic processing on detection signals received from various sensors, so as to perform ON/OFF controls on the switching elements S1, S2, S3 of the voltage transducer 14 and an ON/OFF control on the switching element of the inverter 16. By performing ON/OFF controls on the switching elements of the voltage transducer 14 and the inverter 16, driving of the rotary electric machine 12 is controlled.

Further, the controlling portion 18 performs ON/OFF (contact closing/contact opening) controls on the system main relays SMR1, SMR2. As will be described later, by performing ON/OFF controls on the system main relays SMR1, SMR2 according to ON-fault states of the switching elements S1, S2, S3, a step-up/step-down operation can be performed at the time of an ON fault of the switching elements S1, S2, S3.

Figure 28:
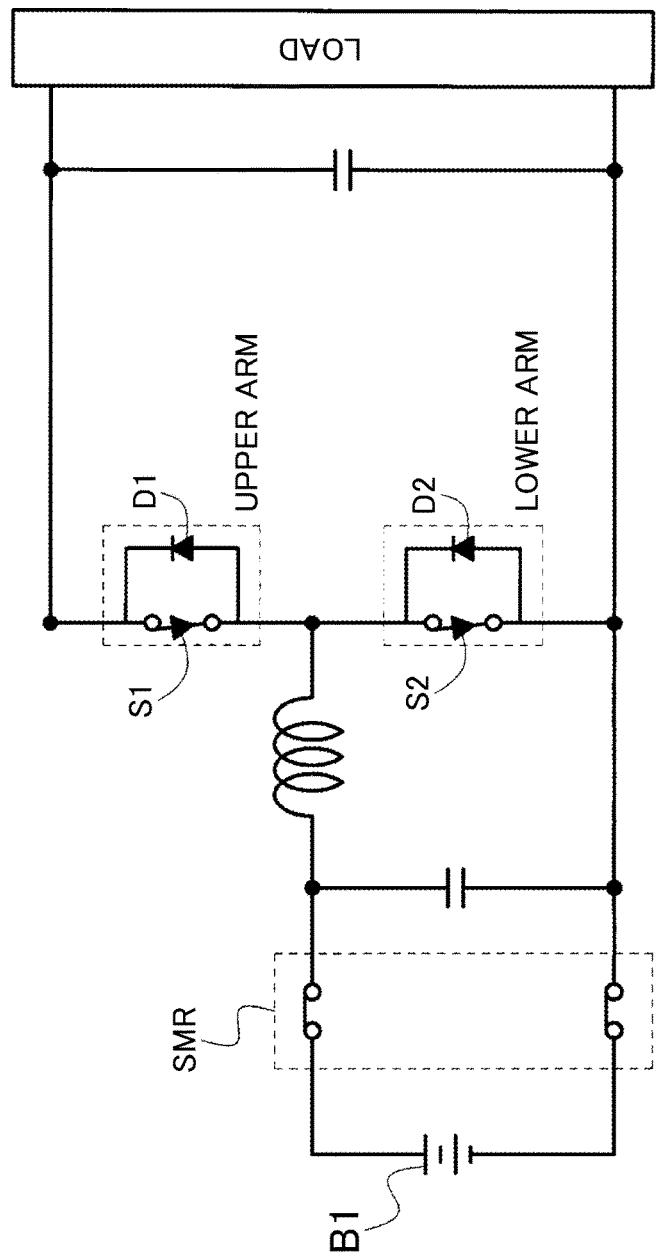
FIG. 28 is a view exemplifying a conventional buck-boost converter.
Figure 29:
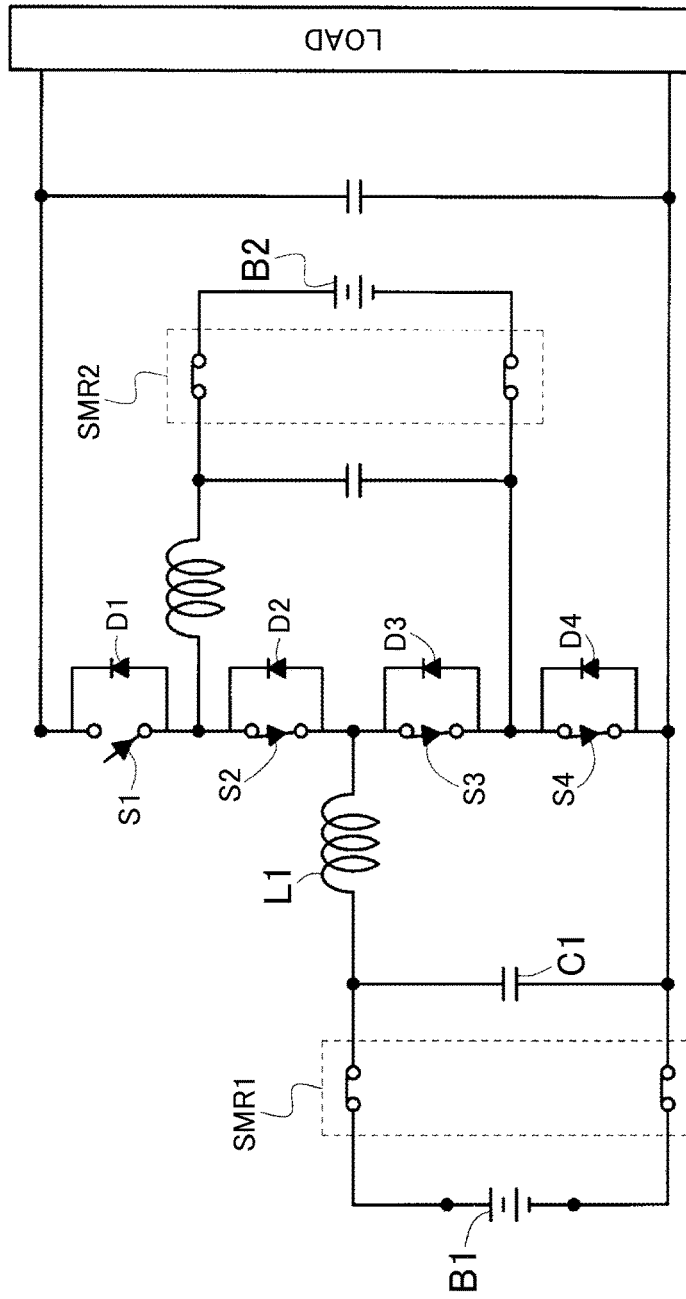
FIG. 29 is a view exemplifying a conventional voltage transducer.

The voltage transducer 14 according to the present embodiment has an expanded function of a conventional buck-boost converter illustrated in FIG. 28. In view of this, the following description describes an operation of the voltage transducer 14 according to the present embodiment based on an operation of the conventional buck-boost converter.

Further, the operation of the voltage transducer 14 according to the present embodiment is obtained such that respective operations of a first buck-boost circuit CNV1 on a first-battery-B1 side and a second buck-boost circuit CNV2 on a second-battery-B2 side are superimposed on top of each other by a so-called principle of superposition (superposition theorem). In view of this, the following description describes a buck-boost circuit of the voltage transducer 14 according to the present embodiment based on two buck-boost circuits CNV1, CNV2, separately, for convenience.

First, the conventional buck-boost converter illustrated in FIG. 28 is described. In this converter, two arms are divided into an "upper arm" and a "lower arm."

Conventionally, the lower arm indicates an arm forming a loop circuit including a battery and a reactor. The upper arm indicates an arm that connects a battery, a reactor, and a load (a high-voltage electric circuit 28).

Switching elements of the upper arm and the lower arm are turned on/off complementarily. That is, when the switching element of the lower arm is turned on, the switching element of the upper arm is turned off. Conversely, when the switching element of the upper arm is turned on, the switching element of the lower arm is turned off.

Note that, in the following description, a state where a switching element of an arm is turned on is just referred to as "arm ON" and a state where a switching element of an arm is turned off is just referred to as "arm OFF."

A step-up/step-down operation by the conventional buck-boost converter is well known, but is described here briefly. When an electric power is transferred to an output side, an electric energy from a battery is first stored in a reactor by lower-arm ON as a step-up process. Then, the electric power thus stored in the reactor is added to an electric power of the battery by lower-arm OFF, and then sent to the output side. When the electric power is transferred to a battery side, an electric energy from the output side is stored in the reactor by upper-arm ON as a step-down process. Further, the electric power thus stored in the reactor is sent to the battery by upper-arm OFF. By controlling a ratio between ON times of the upper and lower arms that are turned on/off complementarily, an output voltage of the buck-boost converter is controlled.

Figure 3:
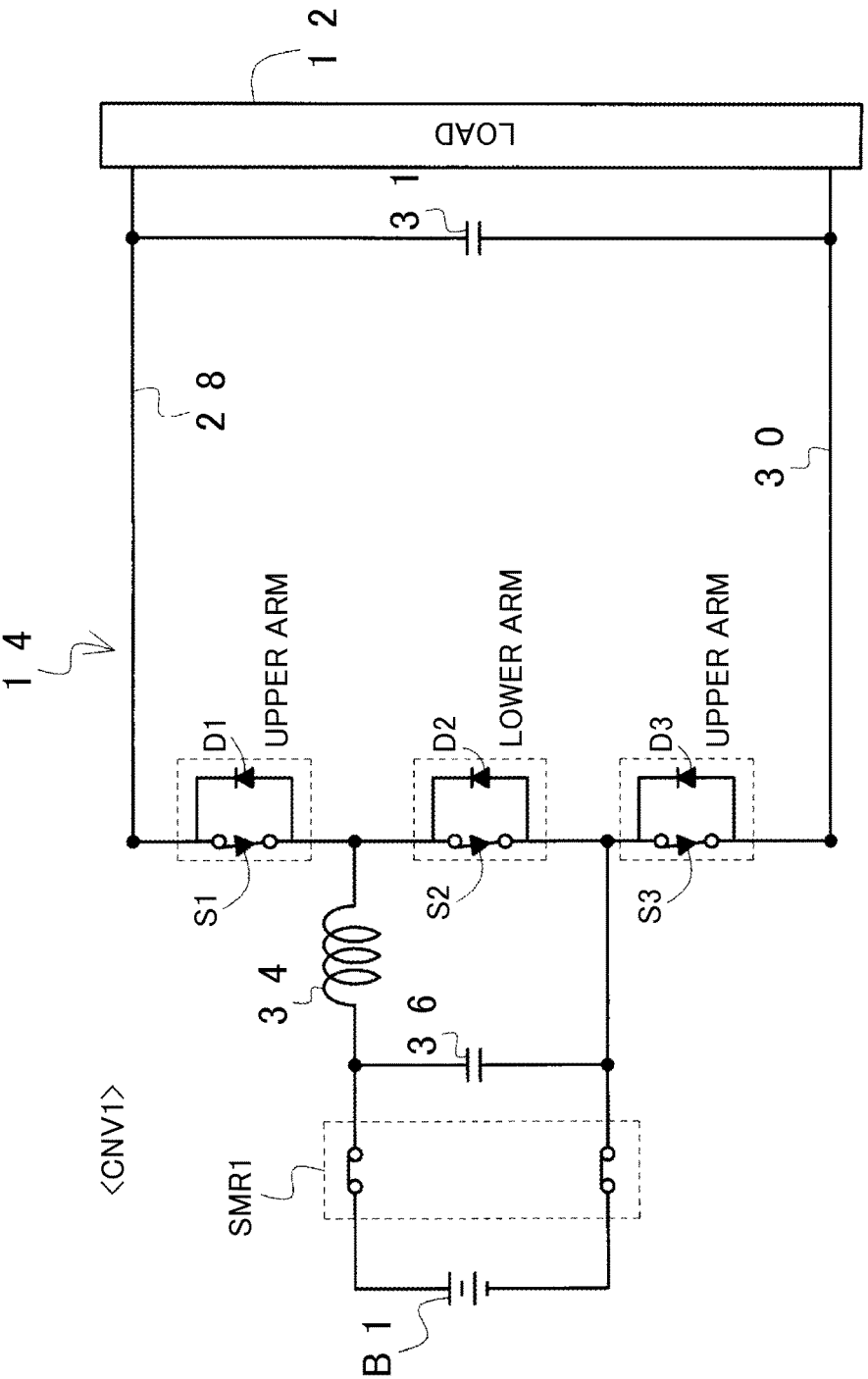
FIG. 3 is a view of a first buck-boost circuit extracted from the power supply system according to the present embodiment.

FIG. 3 is a view of the first buck-boost circuit CNV1 extracted from the voltage transducer 14 according to the present embodiment. From the viewpoint of the aforementioned functions of the upper arm and the lower arm, in the first buck-boost circuit CNV1 illustrated in FIG. 3, an arm (an S1-arm) including the switching element Si and an arm (an S3-arm) including the switching element S3 serve as upper arms, and an arm (an S2-arm) including the switching element S2 serves as a lower arm.

Figure 4:
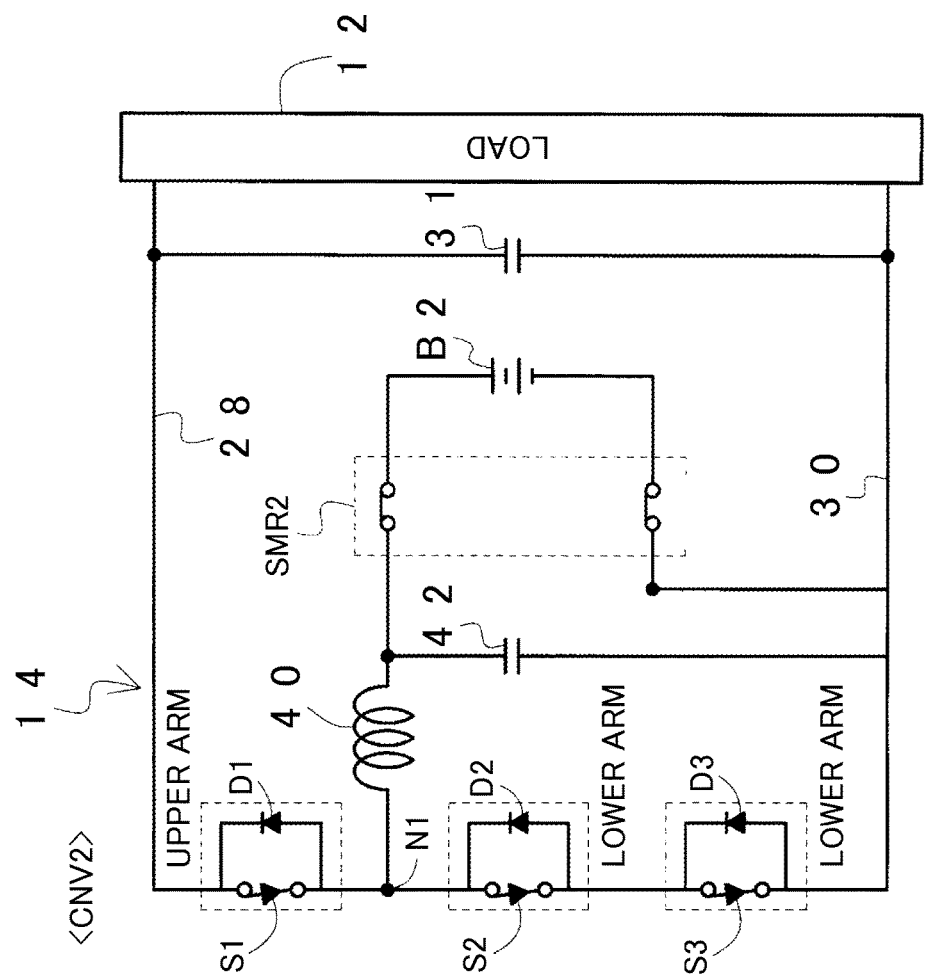
FIG. 4 is a view of a second buck-boost circuit extracted from the power supply system according to the present embodiment.

FIG. 4 is an extracted view of the second buck-boost circuit CNV2 on a second-battery-B2 side. Similarly to the first buck-boost circuit CNV1, in terms of roles of respective arms when viewed from the second buck-boost circuit CNV2, the S1-arm serves as an upper arm, and the S2-arm and the S3-arm serve as lower arms.

From the above description, the S1-arm, the S2-arm, and the S3-arm when viewed from each of the buck-boost circuits CNV1, CNV2 have roles as described in Table 1 below.

TABLE 1

|  | S1-arm | S2-arm | S3-arm |
| --- | --- | --- | --- |
| Buck-boost circuit CNV1 | Upper arm | Lower arm | Upper arm |
| Buck-boost circuit CNV2 | Upper arm | Lower arm | Lower arm |

As illustrated in Table 1, the voltage transducer 14 according to the present embodiment includes the S3-arm that functions as the upper arm for the first buck-boost circuit CNV1 and also functions as the lower arm for the second buck-boost circuit CNV2, in addition to the S1-arm as the upper arm and the S2-arm as the lower arm.

In such a configuration, the first buck-boost circuit CNV1 includes the S3-arm as another upper arm, and therefore, even if the S1-arm serving as the upper arm has an ON fault, a step-up/step-down operation is performable by using the S2-arm (the lower arm) and the S3-arm (the upper arm). Further, the second buck-boost circuit CNV2 includes the S3-arm as another lower arm, and therefore, even if the S2-arm serving as the lower arm has an ON fault, a step-up/step-down operation is performable by using the S1-arm (the upper arm) and the S3-arm (the lower arm). As such, the voltage transducer according to the present embodiment is configured such that a step-up/step-down operation is performable even at the time of an ON fault of a switching element. Note that a step-up/step-down operation by the S1-arm and the S2-arm is performable with the S3-arm being turned on continuously.

An operation of the voltage transducer 14 in a normal time in which none of the switching elements S1, S2, S3 has an ON fault is described with reference to FIGS. 5 to 8.

Figure 5:
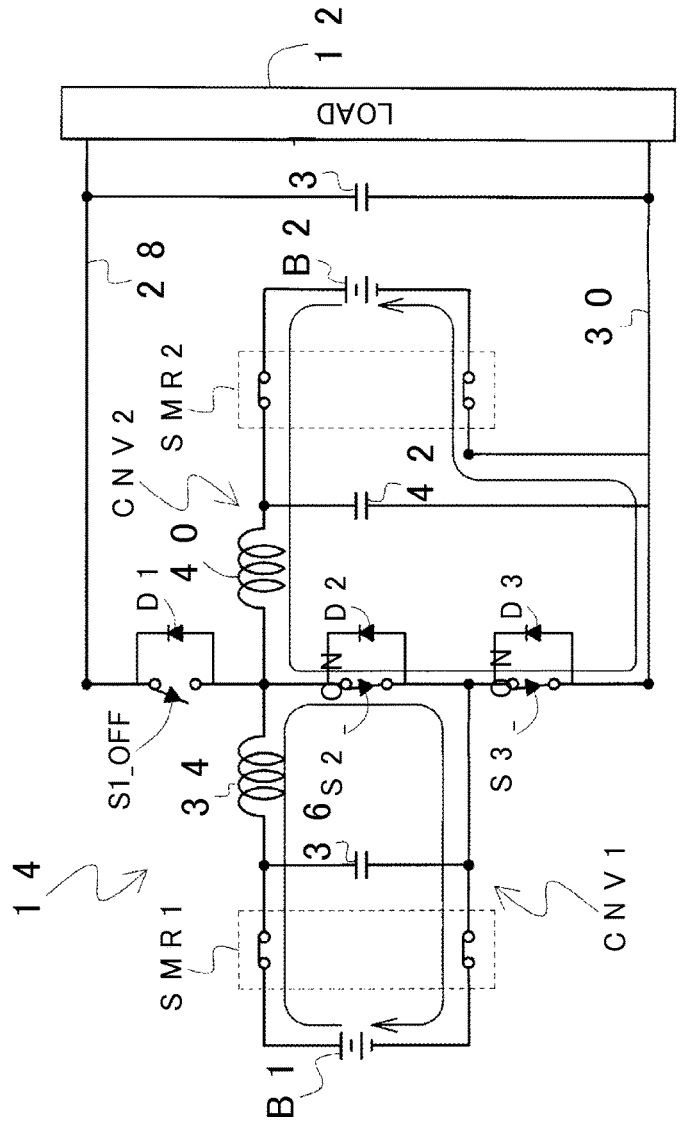
FIG. 5 is a view exemplifying an operation at the time of step-up storage in a parallel step-up/step-down mode in a normal time, among step-up/step-down operations using the power supply system according to the present embodiment.
Figure 6:
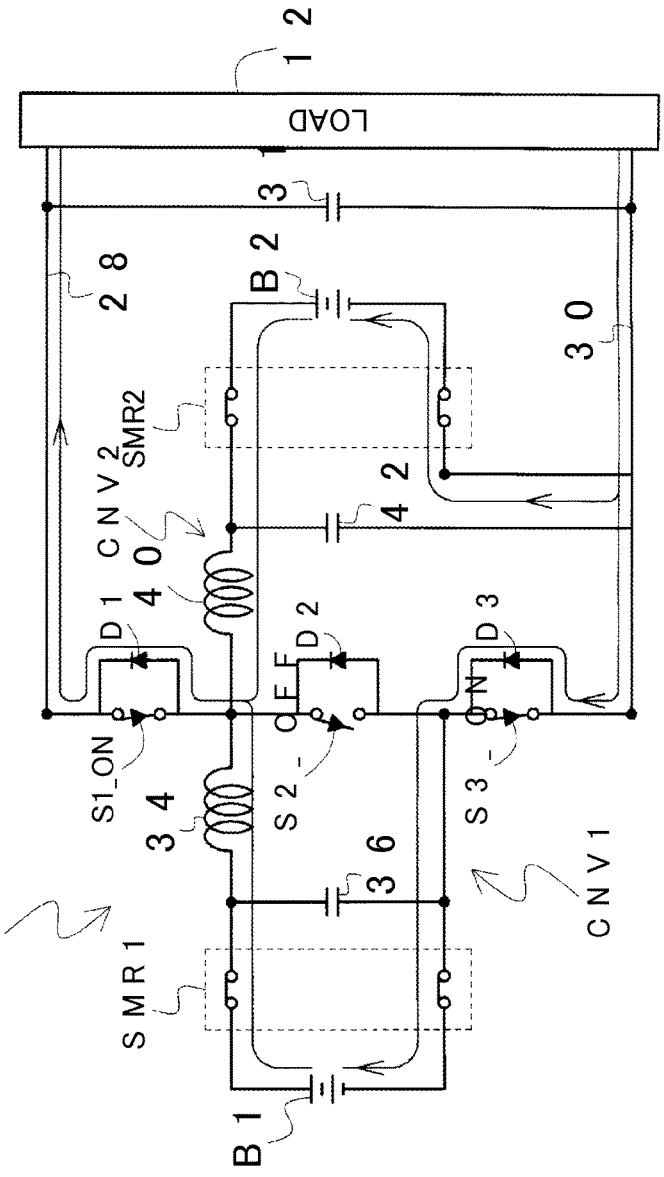
FIG. 6 is a view exemplifying an operation at the time of step-up discharge in the parallel step-up/step-down mode in a normal time, among the step-up/step-down operations using the power supply system according to the present embodiment.

FIGS. 5, 6 illustrate an operation at the time when voltages of the first battery B1 and the second battery B2 are stepped up by the voltage transducer 14. FIG. 5 illustrates currents to cause an electric energy to be stored in the first reactor 34 and the second reactor 40 from the first battery B1 and the second battery B2.

As described above, at the time of step-up storage, lower-arm ON is achieved, and upper-arm OFF is achieved accordingly. That is, in the first buck-boost circuit CNV1, the S1-arm and the S3-arm are turned off, and the S2-arm is turned on. In the meantime, in the second buck-boost circuit CNV2, the S1-arm is turned off, and the S2-arm and the S3-arm are turned on. The controlling portion 18 finds a logical sum (ON=1, OFF=0) thereof, and achieves S1-arm OFF, S2-arm ON, and S3-arm ON.

FIG. 6 illustrates an operation at the time when the electric energy thus stored is discharged to the load. As described above, at the time of step-up discharge, lower-arm OFF is achieved, and upper-arm ON is achieved accordingly. That is, in the first buck-boost circuit CNV1, the S1-arm and the S3-arm are turned on, and the S2-arm is turned off. In the meantime, in the second buck-boost circuit CNV2, the S1-arm is turned on, and the S2-arm and the S3-arm are turned off. The controlling portion 18 finds a logical sum thereof, and achieves S1-arm ON, S2-arm OFF, and S3-arm ON.

Figure 7:
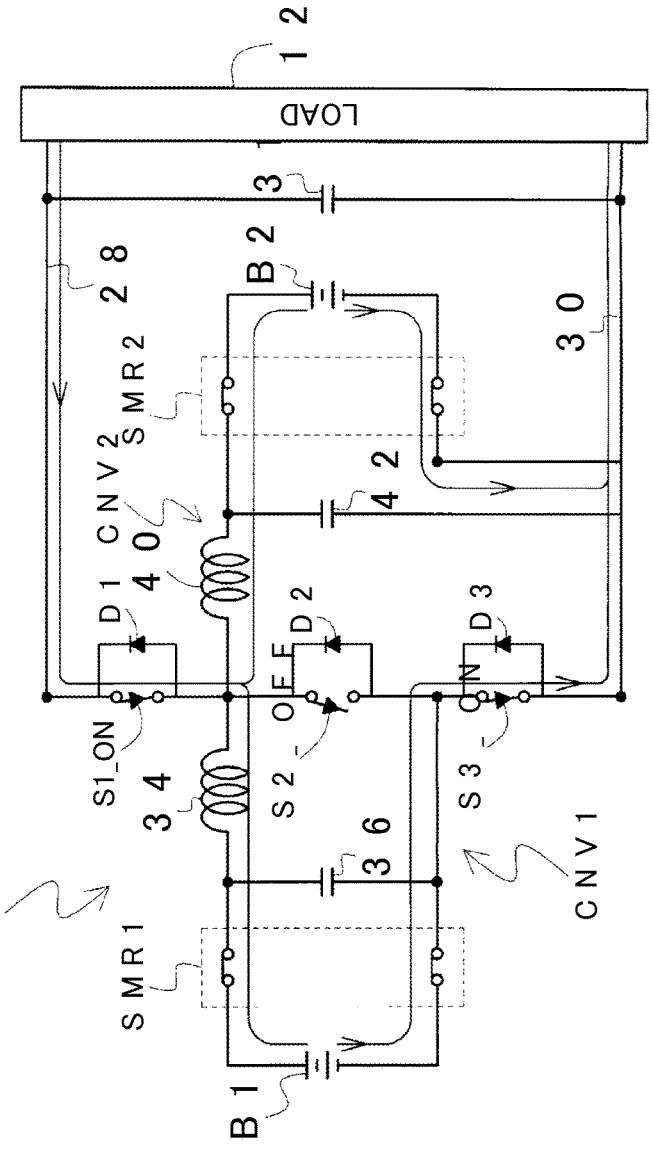
FIG. 7 is a view exemplifying an operation at the time of step-down storage in the parallel step-up/step-down mode in a normal time, among the step-up/step-down operations using the power supply system according to the present embodiment.
Figure 8:
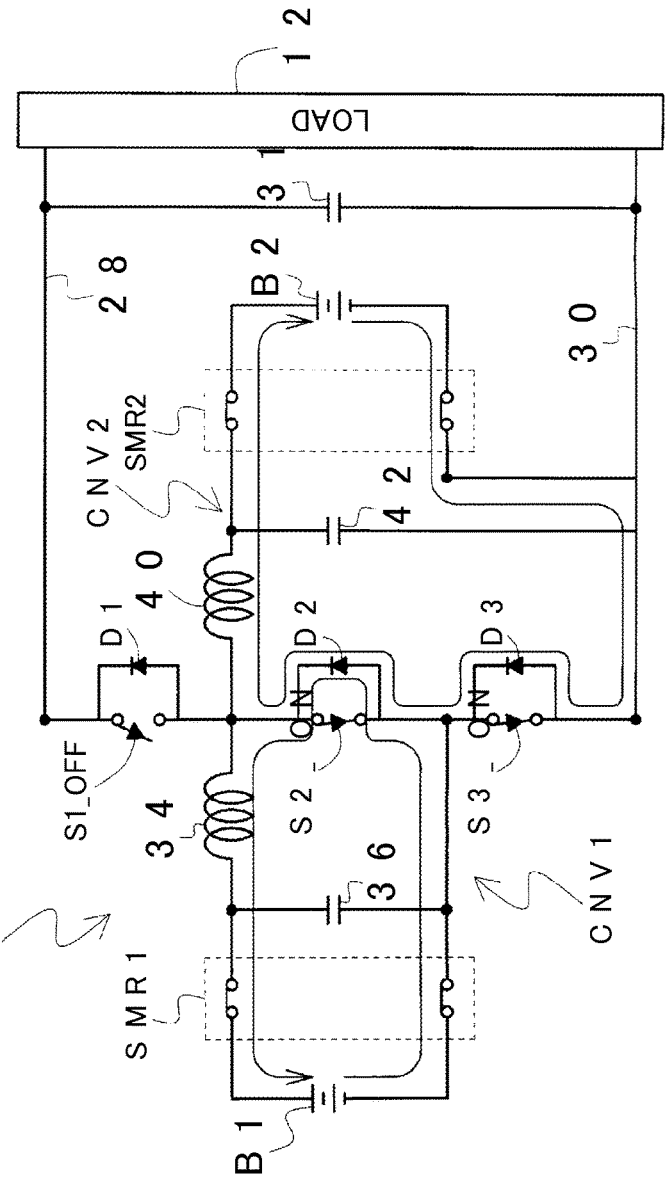
FIG. 8 is a view exemplifying an operation at the time of step-down discharge in the parallel step-up/step-down mode in a normal time, among the step-up/step-down operations using the power supply system according to the present embodiment.

FIGS. 7, 8 illustrate an operation at the time when an output-side energy from the rotary electric machine 12 is stepped down. FIG. 7 exemplifies an operation at the time when the output-side energy is stored in the first reactor 34 and the second reactor 40. At the time of step-down storage, upper-arm ON is achieved, and lower-arm OFF is achieved accordingly. That is, similarly to FIG. 6, in the first buck-boost circuit CNV1, the S1-arm and the S3-arm are turned on, and the S2-arm is turned off. In the meantime, in the second buck-boost circuit CNV2, the S1-arm is turned on, and the S2-arm and the S3-arm are turned off. The controlling portion 18 finds a logical sum thereof, and achieves S1-arm ON, S2-arm OFF, and S3-arm ON.

FIG. 8 illustrates an operation at the time when electric energies stored in the first reactor 34 and the second reactor 40 in FIG. 7 are discharged to the first battery B1 and the second battery B2. At the time of step-down discharge, upper-arm OFF is achieved, and lower-arm ON is achieved accordingly. That is, similarly to FIG. 5, in the first buck-boost circuit CNV1, the S1-arm and the S3-arm are turned off, and the S2-arm is turned on. In the meantime, in the second buck-boost circuit CNV2, the S1-arm is turned off, and the S2-arm and the S3-arm are turned on. The controlling portion 18 finds a logical sum thereof, and achieves S1-arm OFF, S2-arm ON, and S3-arm ON.

As illustrated in FIGS. 5 to 8, in a parallel step-up/step-down operation in a normal time, the switching element S3 is in a continuously ON state, so that the batteries B1, B2 are connected in parallel with each other, and the S1-arm and the S2-arm are controlled to be ON/OFF complementarily.

Note that, in the parallel step-up/step-down as illustrated in FIGS. 5 to 8, the first buck-boost circuit CNV1 and the second buck-boost circuit CNV2 are controlled so as to become generally equipotential. For example, when there are predetermined voltage request and current request to the load, a voltage control to step up an output voltage to a requested voltage is performed in the second buck-boost circuit CNV2. In the meantime, in the first buck-boost circuit CNV1, a current control to output a current that compensates a difference between a requested current and an output current of the second buck-boost circuit CNV2 is performed.

An operation of the voltage transducer 14 at the time when the switching element S1 has an ON fault (short-circuit fault) is described with reference to FIGS. 9, 10. Note that, in the descriptions of FIGS. 5 to 8, the arms perform the same operations at the time of step-up storage and at the time of step-down discharge, and also at the time of step-up discharge and at the time of step-down storage. In view of this, in the following description, operations at the time of step-up storage and at the time of step-down discharge are described collectively, and operations at the time of step-up discharge and at the time of step-down storage are also described collectively.

Figure 9:
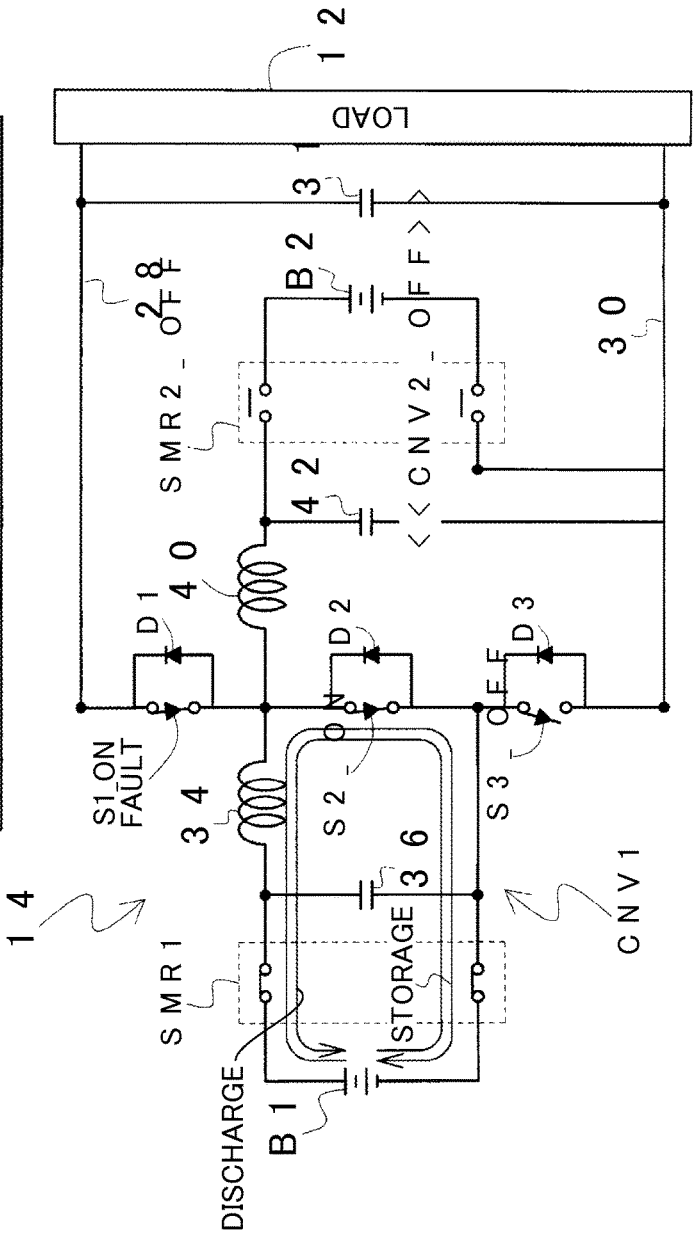
FIG. 9 is a view exemplifying an operation at the time of step-up storage and step-down discharge in a step-up/step-down mode in an ON fault of a switching element S1, among the step-up/step-down operations using the power supply system according to the present embodiment.

As illustrated in FIG. 9, at the time of an ON fault of the switching element S1 (an ON fault of the S1-arm), an upper arm, viewed from the second buck-boost circuit CNV2, has an ON fault, so that an step-up/step-down operation using the circuit CNV2 cannot be performed. In view of this, the controlling portion 18 performs the following switch control as a first failsafe mode. That is, the controlling portion 18 turns off the system main relay SMR2 (contact opening) so as to separate the second battery B2 from the voltage transducer 14, thereby stopping an operation of the second buck-boost circuit CNV2. Then, a step-up/step-down operation is performed by the first buck-boost circuit CNV1.

FIG. 9 illustrates an operation at the time of step-up storage and at the time of step-down discharge, when the switching element S1 has an ON fault. As described above, at the time of step-up storage and step-down discharge, an upper arm is turned off and a lower arm is turned on. That is, in the first buck-boost circuit CNV1 (the S1-arm has an ON fault), the S2-arm is turned on, and the S3-arm is turned off. In the meantime, since the second buck-boost circuit CNV2 stops its operation, an operation of the first buck-boost circuit CNV1 is just reflected as a logical sum.

Figure 10:
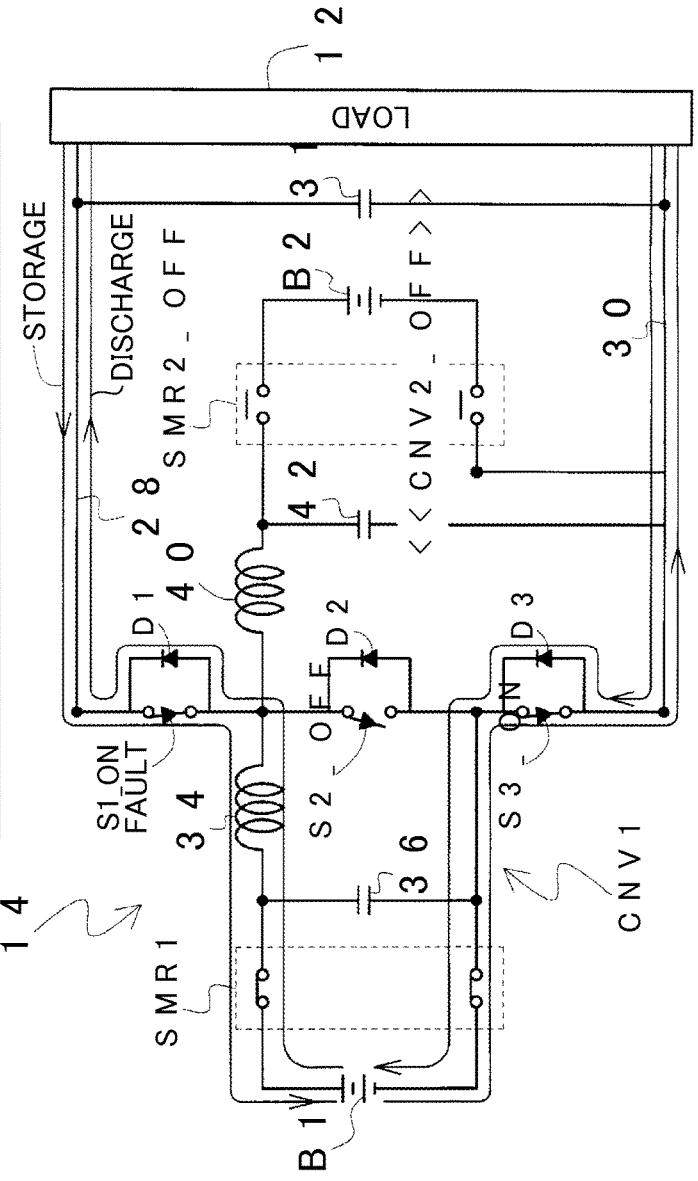
FIG. 10 is a view exemplifying an operation at the time of step-up discharge and step-down storage in the step-up/step-down mode in the ON fault of the switching element S1, among the step-up/step-down operations using the power supply system according to the present embodiment.

FIG. 10 illustrates an operation at the time of step-up discharge and at the time of step-down storage, when the switching element S1 has an ON fault. As described above, at the time of step-up discharge and at the time of step-down storage, an upper arm is turned on and a lower arm is turned off. That is, in the first buck-boost circuit CNV1 (the S1-arm has an ON fault), the S2-arm is turned off, and the S3-arm is turned on.

An operation of the voltage transducer 14 at the time when the switching element S2 has an ON fault is described with reference to FIGS. 11, 12. As illustrated in these figures, at the time of an ON fault of the switching element S2 (an ON fault of the S2-arm), a lower arm, viewed from the first buck-boost circuit CNV1, has an ON fault, so that a step-up/step-down operation using the circuit CNV1 cannot be performed. In view of this, the controlling portion 18 performs the following switch control as a second failsafe mode. That is, the controlling portion 18 turns off the system main relay SMR1 so as to separate the first battery B1 from the voltage transducer 14, thereby stopping an operation of the first buck-boost circuit CNV1. Further, a step-up/step-down operation is performed by the second buck-boost circuit CNV2.

Figure 11:
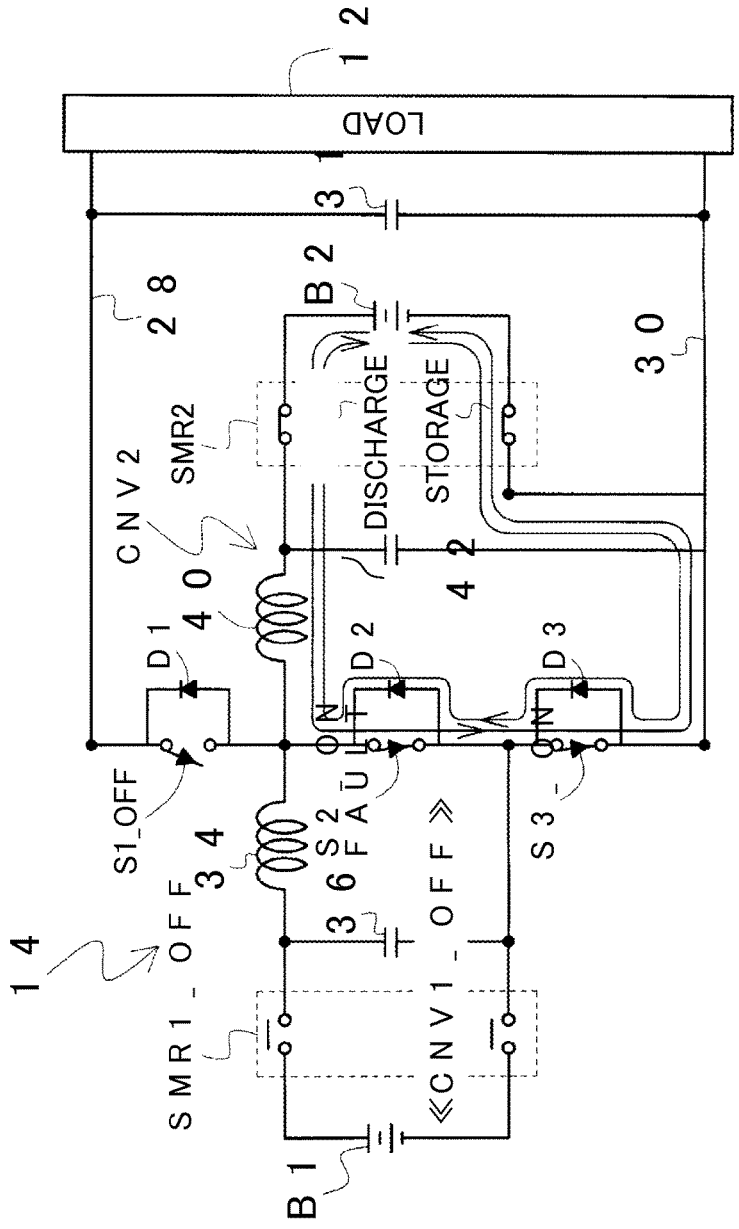
FIG. 11 is a view exemplifying an operation at the time of step-up storage and step-down discharge in a step-up/step-down mode in an ON fault of a switching element S2, among the step-up/step-down operations using the power supply system according to the present embodiment.

FIG. 11 illustrates an operation at the time of step-up storage and at the time of step-down discharge, when the switching element S2 has an ON fault. At the time of step-up storage and at the time of step-down discharge, an upper arm is turned off and a lower arm is turned on. That is, in the second buck-boost circuit CNV2, the S1-arm is turned off (the S2-arm has an ON fault), and the S3-arm is turned on. In the meantime, since the first buck-boost circuit CNV1 stops its operation, an operation of the second buck-boost circuit CNV2 is just reflected as a logical sum.

Figure 12:
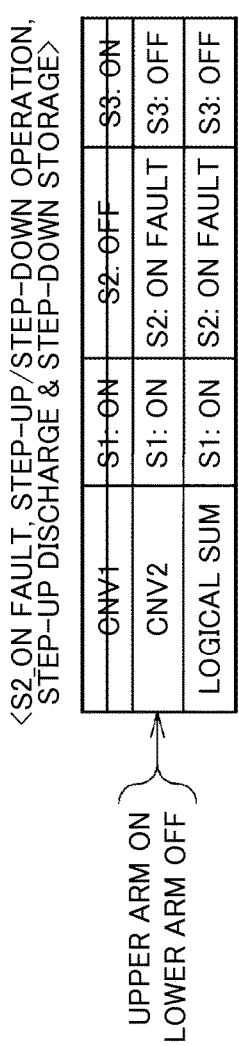
FIG. 12 is a view exemplifying an operation at the time of step-up discharge and step-down storage in the step-up/step-down mode in the ON fault of the switching element S2, among the step-up/step-down operations using the power supply system according to the present embodiment.

FIG. 12 illustrates an operation at the time of step-up discharge and at the time of step-down storage, when the switching element S2 has an ON fault. At the time of step-up discharge and at the time of step-down storage, an upper arm is turned on and a lower arm is turned off. That is, in the second buck-boost circuit CNV2, the S1-arm is turned on (the S2-arm has an ON fault), and the S3-arm is turned off.

As illustrated in FIGS. 9 to 12, at the time when the S1-arm or the S2-arm has an ON fault, the S3-arm is controlled to be ON/OFF instead of the arm thus having an ON fault. Hereby, one of two buck-boost circuits CNV1, CNV2 is usable, which makes it possible to perform a step-up/step-down operation at the time of an ON fault of a switching element, which cannot be performed in the related art.

An operation at the time of an ON fault of the switching element S3 is the same as the parallel step-up/step-down operation (FIGS. 5 to 8) in a normal time in which the switching element S3 is turned on continuously. That is, fields for S3 in an upper table in FIGS. 5 to 8 are replaced with "S3: ON fault," so that an operation at the time of an ON fault of the switching element S3 is obtained. In view of this, illustration and detailed descriptions thereof are omitted herein.

Figure 13:
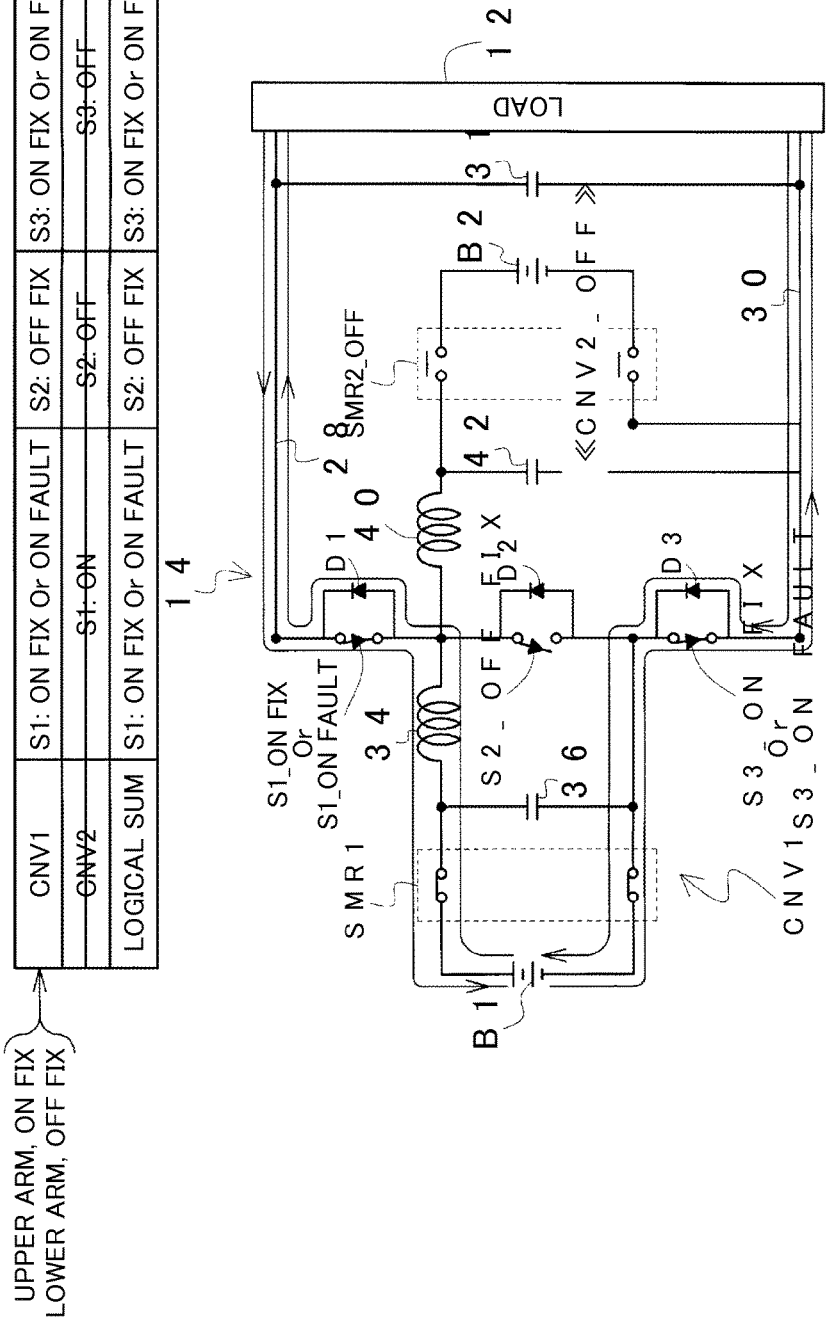
FIG. 13 is a view exemplifying an operation in a B1 single direct connection mode using the power supply system according to the present embodiment.

Note that the voltage transducer 14 according to the present embodiment is not limited to the aforementioned step-up/step-down operations, but can perform various operations. FIG. 13 illustrates an operation at the time when the first battery B1 singularly supplies an electric power to the load without performing a step-up/step-down operation. At this time, the first buck-boost circuit CNV1 and the second buck-boost circuit CNV2 may not become equipotential, unlike the step-up/stepdown operation. In this case, an inter-battery current (current loop) via the S3-arm might occur between the first battery B1 and the second battery B2 depending on a potential difference. In view of this, in a B1 single direct connection mode, the controlling portion 18 turns off the system main relay SMR2 so as to separate the second battery B2 from the voltage transducer 14.

In the B1 single direct connection mode, only the operation of the first buck-boost circuit CNV1 at the time of step-up discharge in the parallel step-up/step-down operation in a normal time as illustrated in FIG. 6 is picked out and fixed. That is, in the B1 single direct connection mode, the S1-arm is fixed to an ON state, the S2-arm is fixed to an OFF state, and the S3-arm is fixed to an ON state. Note that, in this mode, the S1-arm and the S3-arm are fixed to an ON state. Accordingly, even in a case where the S1-arm and the S3-arm have an ON fault, this mode can be used.

Figure 14:
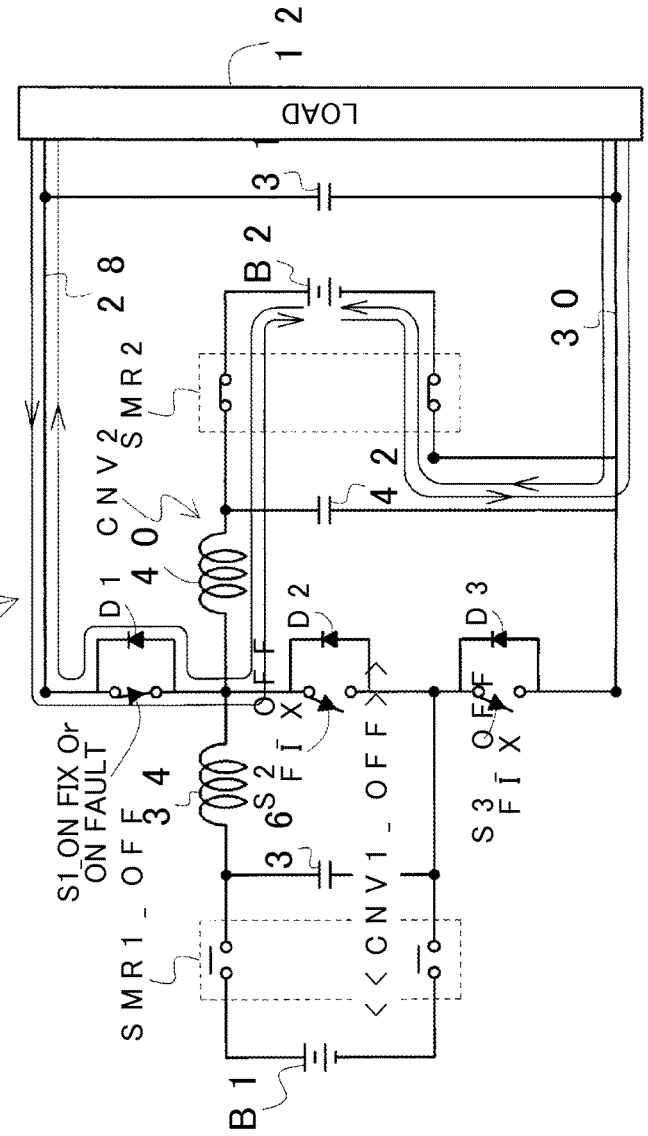
FIG. 14 is a view exemplifying an operation in a B2 single direct connection mode using the power supply system according to the present embodiment.

FIG. 14 illustrates an operation at the time when the second battery B2 singularly supplies an electric power to the load, instead of FIG. 13. In a B2 single direct connection mode, the controlling portion 18 turns off the system main relay SMR1 so as to separate the first battery B1 from the voltage transducer 14.

In the B2 single direct connection mode, only the operation of the second buck-boost circuit CNV2 at the time of step-up discharge in the parallel step-up/step-down operation in a normal time is picked out and fixed. That is, in the B2 single direct connection mode, the S1-arm is fixed to an ON state, the S2-arm is fixed to an OFF state, and the S3-arm is fixed to an OFF state. Note that, in this mode, the S1-arm is fixed to an ON state. Accordingly, even in a case where the S1-arm has an ON fault, this mode can be used.

Figure 15:
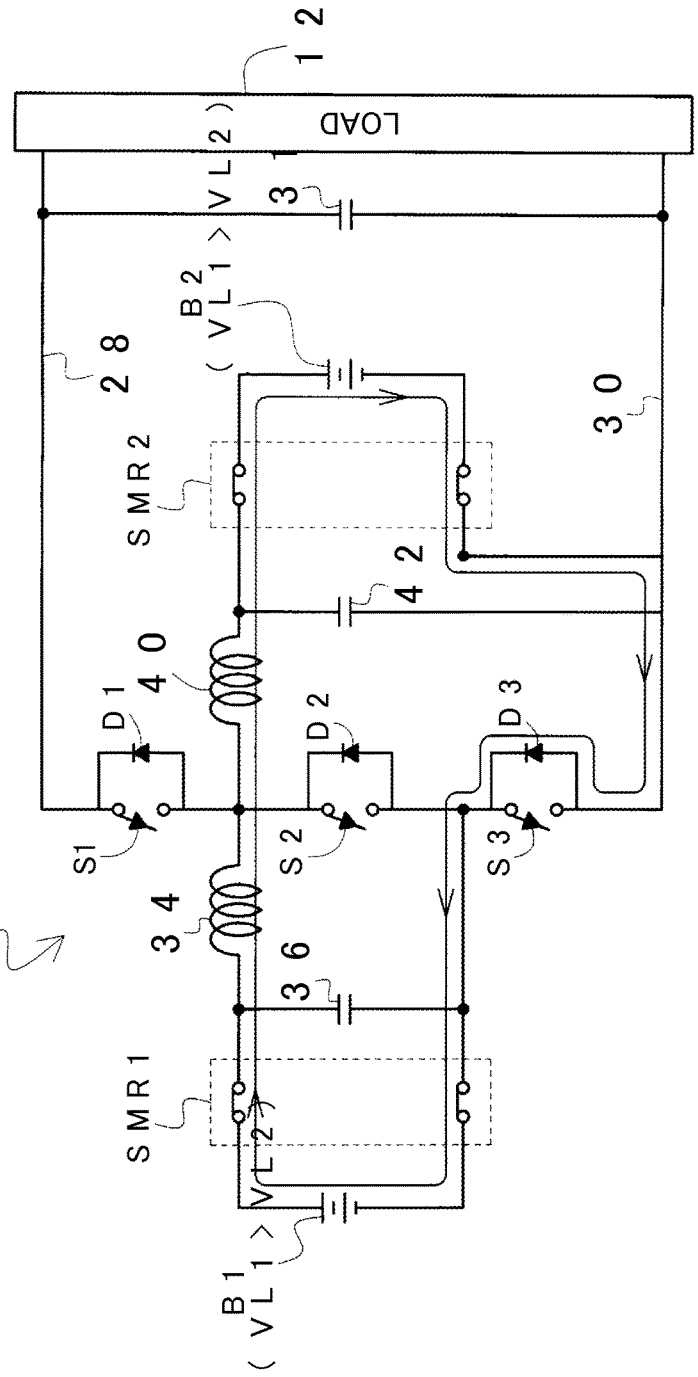
FIG. 15 is a view to describe an inter-battery current.

As described above, in the power supply system according to the present embodiment, an inter-battery current (current loop) via the S3-arm might occur between the first battery B1 and the second battery B2. For example, as illustrated in FIG. 15, in a case where the system main relays SMR1 and SMR2 are ON states and the first battery voltage VL1 has a higher voltage than the second battery voltage VL2, even if the switching elements S1 to S3 are turned off, a current loop is formed between the first battery B1 and the second battery B2 via the diode D3 of the S3-arm. Such an operation state can occur at the time when the power supply system starts, that is, after the system main relays SMR1, SMR2 are turned on but before a step-up/step-down operation starts.

In view of this, in the power supply system 10 according to the present embodiment, a second battery voltage VL2 is set higher than a first battery voltage VL1, thereby preventing the occurrence of the inter-battery current via the diode D3 of the S3-arm. If the switching element S3 is turned off in such a voltage relationship, it is possible to prevent the occurrence of the inter-battery current. That is, by controlling ON/OFF of the switching element S3, connection/disconnection between the first battery B1 and the second battery B2 can be controlled.

Note that, in order to start the parallel step-up/step-down operation after the power supply system starts, charging may be necessary due to a decrease in an SOC of the first battery B1. In such a case, the switching element S3 is operated so as to charge the first battery B1 from the second battery B2.

At the time of the charging, if a potential difference between the first battery voltage VL1 and the second battery voltage VL2 is large, a heavy-current may flow into the first battery B1, which might lead to deterioration of the first battery B1. In view of this, in the power supply system 10 according to the present embodiment, a collector-emitter conduction resistance of the switching element S3 is adjusted, so as to control a charging current.

Figure 16:
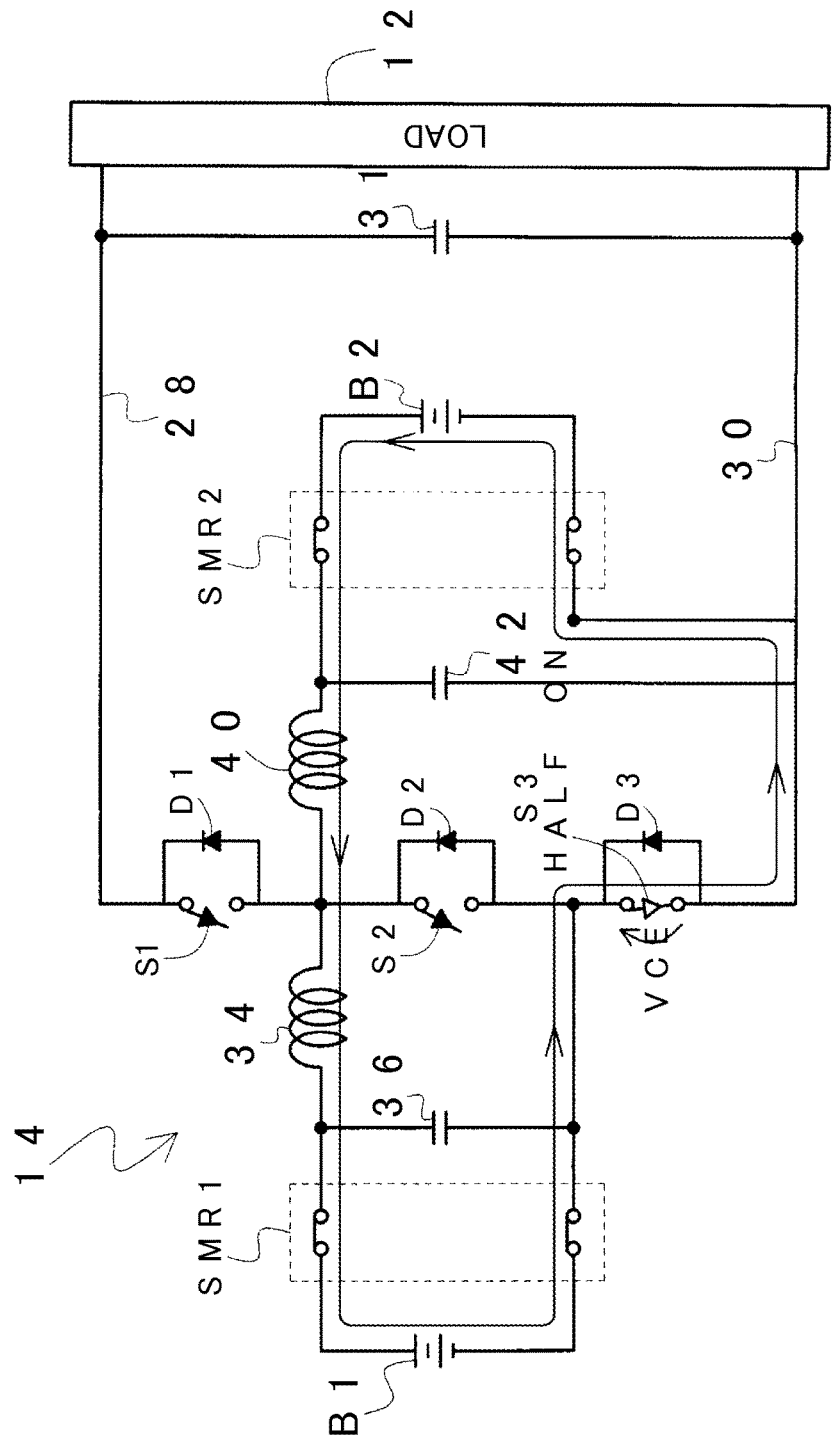
FIG. 16 is a view to describe a half-ON control by a switching element S3.

FIG. 16 exemplifies a control at the time of charging the first battery B1. The controlling portion 18 decreases a conduction ratio of the switching element S3 as compared with a normal ON operation, thereby reducing a charging current amount to be supplied to the first battery B1 via the switching element S3.

More specifically, the controlling portion 18 adjusts a gate voltage $V_G$ of the switching element S3, so that a collector-emitter voltage $V_{CE}$ of the switching element S3 is set so as to be higher than that of a normal ON operation (half-ON). For example, the collector-emitter voltage $V_{CE}$ is adjusted so that a sum of the first battery voltage VL1 and the collector-emitter voltage $V_{CE}$ of the switching element S3 is slightly lower than the second battery voltage VL2. For example, the collector-emitter voltage $V_{CE}$ is adjusted so as to satisfy $(VL1+V_{CE})-VL2=5V$.

Alternatively, instead of the aforementioned voltage control, the controlling portion 18 may perform a current control of controlling the gate voltage $V_G$ of the switching element S3 so that a first battery current IB1 detected by a battery current sensor 54A falls within a predetermined threshold.

Figure 17:
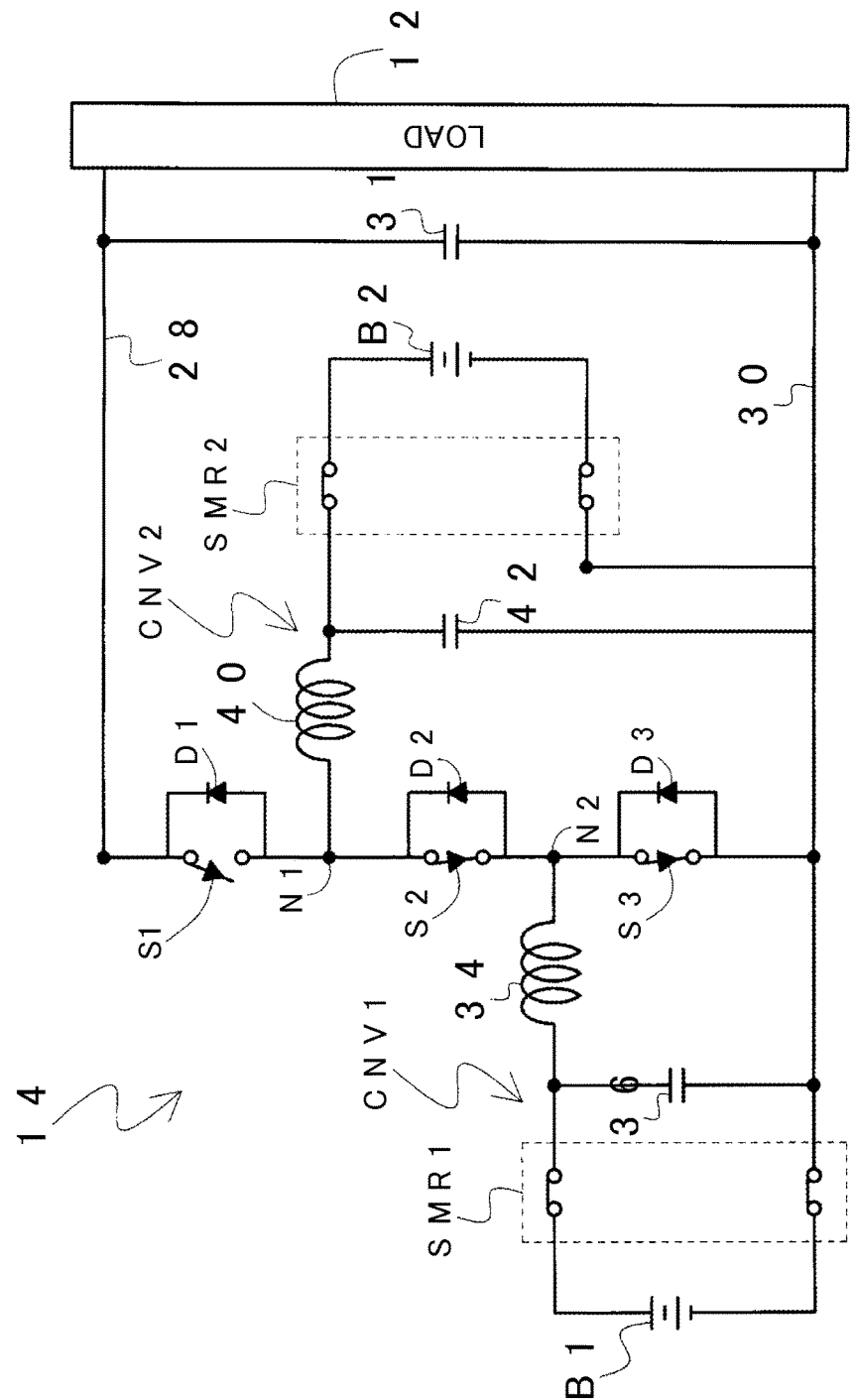
FIG. 17 is a configuration diagram of a power supply system according to another embodiment.

FIG. 17 exemplifies a voltage transducer 14 according to another embodiment. The voltage transducer 14 is different from the voltage transducer 14 of FIG. 2 in a configuration of a first buck-boost circuit CNV1.

That is, a first battery B1 is connected in parallel with a switching element S3, instead of a switching element S2. More specifically, the first battery B1 is connected to a second node N2 between the switching elements S2 and S3, and a reference electric circuit 30.

Further, the voltage transducer 14 is configured such that a first reactor 34 is connected in series with the first battery B1, and a first capacitor 36 is connected in parallel with the first battery B1. Further, a system main relay SMR1 is provided between the voltage transducer 14 and the first battery B1. The other configuration is the same as the voltage transducer 14 illustrated in FIG. 2.

Figure 18:
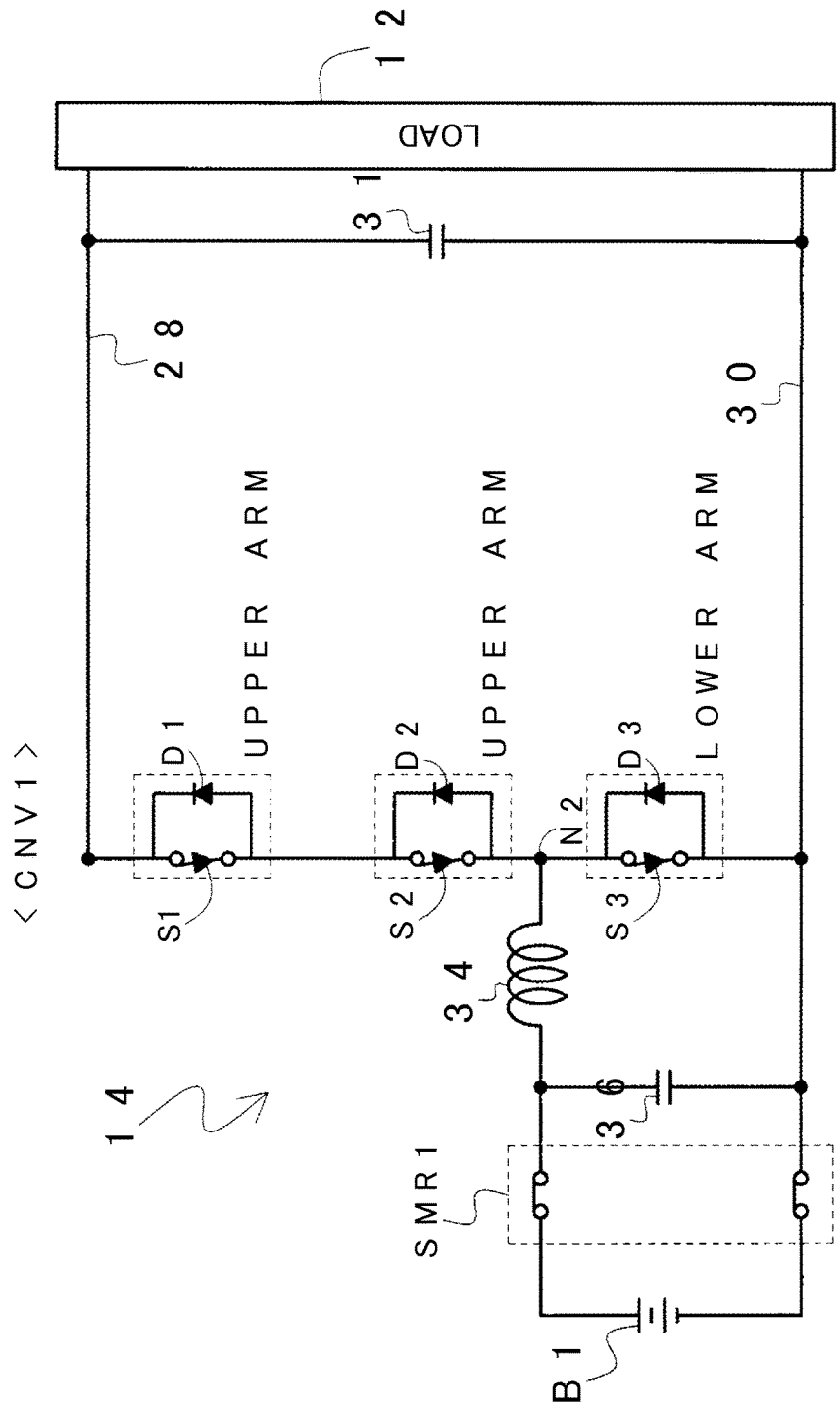
FIG. 18 is a view of a first buck-boost circuit extracted from the power supply system according to the another embodiment.

FIG. 18 is an extracted view of a first buck-boost circuit CNV1. As illustrated in the figure, in the first buck-boost circuit CNV1, an S1-arm and an S2-arm serve as upper arms, and an S3-arm serves as a lower arm.

Figure 19:
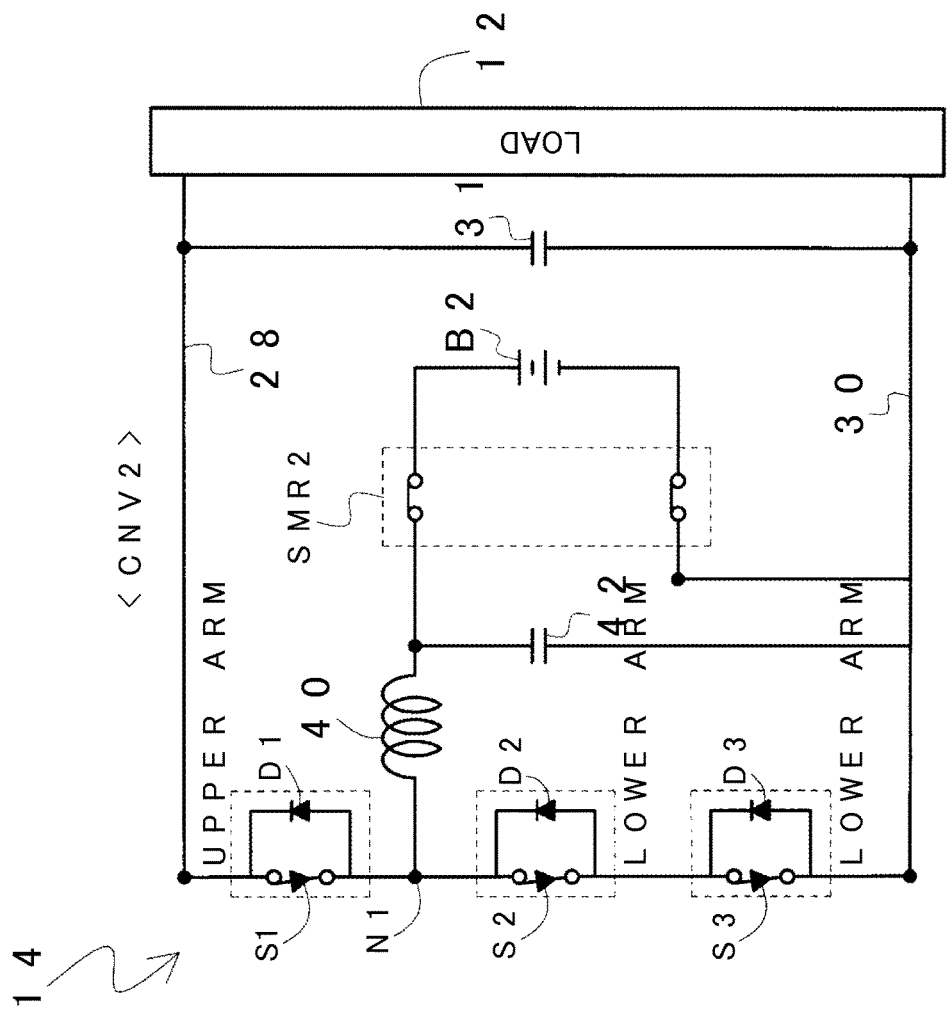
FIG. 19 is a view of a second buck-boost circuit extracted from the power supply system according to the another embodiment.

FIG. 19 is an extracted view of a second buck-boost circuit CNV2. As illustrated in the figure, in the second buck-boost circuit CNV2, the S1-arm serves as an upper arm, and the S2-arm and the S3-arm serve as lower arms.

The S1-arm, the S2-arm, and the S3-arm, viewed from each of the buck-boost circuits CNV1, CNV2, have roles as described in Table 2 below. The first buck-boost circuit CNV1 includes the upper arms redundantly, and the second buck-boost circuit CNV2 includes the lower arms redundantly.

TABLE 2

|  | S1-arm | S2-arm | S3-arm |
|---|---|---|---|
| Buck-boost circuit CNV 1 | Upper arm | Upper arm | Lower arm |
| Buck-boost circuit CNV 2 | Upper arm | Lower arm | Lower arm |

An operation of the voltage transducer 14 in a normal time in which none of the switching elements S1, S2, S3 has an ON fault is described with reference to FIGS. 20, 21.

Figure 20:
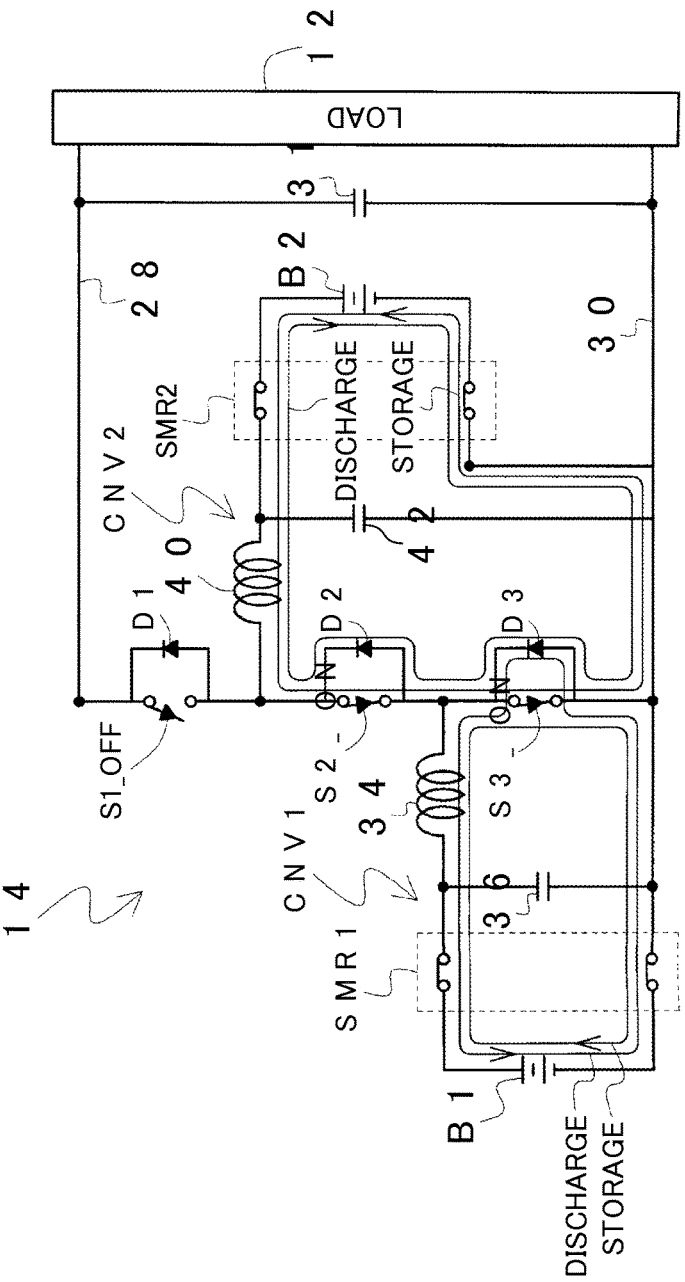
FIG. 20 is a view exemplifying an operation at the time of step-up storage and step-down discharge in a parallel step-up/step-down mode in a normal time, among step-up/step-down operations using the power supply system according to the another embodiment.

FIG. 20 illustrates an operation at the time of step-up storage and at the time of step-down discharge in a parallel step-up/step-down mode of the first battery B1 and the second battery B2. As described above, at the time of step-up storage and at the time of step-down discharge, an upper arm is turned off and a lower arm is turned on. That is, in the first buck-boost circuit CNV1, the S1-arm and the S2-arm are turned off, and the S3-arm is turned on. In the meantime, in the second buck-boost circuit CNV2, the S1-arm is turned off, and the S2-arm and the S3-arm are turned on. The controlling portion 18 finds a logical sum thereof, and achieves S1-arm OFF, S2-arm ON, and S3-arm ON.

Figure 21:
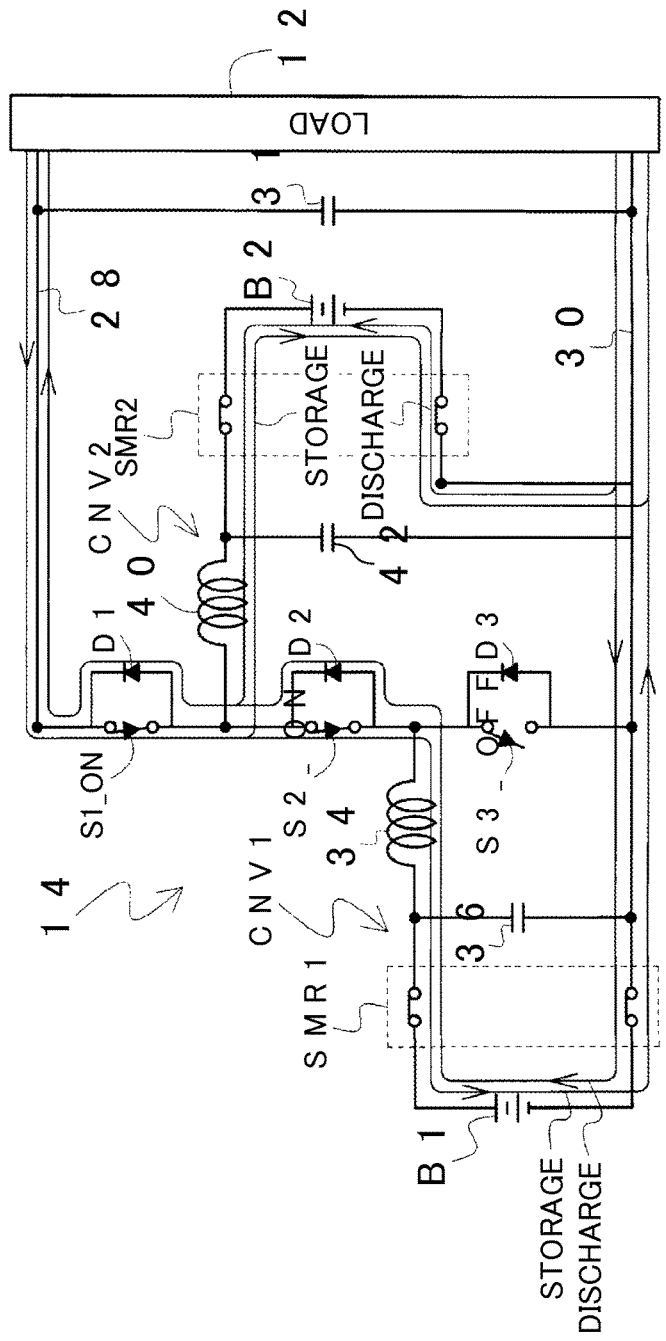
FIG. 21 is a view exemplifying an operation at the time of step-up discharge and step-down storage in the parallel step-up/step-down mode in a normal time, among the step-up/step-down operations using the power supply system according to the another embodiment.

FIG. 21 illustrates an operation at the time of step-up discharge and at the time of step-down storage similarly in the parallel step-up/step-down mode. At the time of step-up discharge and at the time of step-down storage, an upper arm is turned on and a lower arm is turned off. That is, in the first buck-boost circuit CNV1, the S1-arm and the S2-arm are turned on, and the S3-arm is turned off. In the meantime, in the second buck-boost circuit CNV2, the S1-arm is turned on, and the S2-arm and the S3-arm are turned off. The controlling portion 18 finds a logical sum thereof, and achieves S1-arm ON, S2-arm ON, and S3-arm OFF.

As illustrated in FIGS. 20, 21, in a parallel step-up/step-down operation in a normal time, the switching element S2 is in a continuously ON state, and the S1-arm and the S3-arm are controlled to be ON/OFF complementarily.

Figure 22:
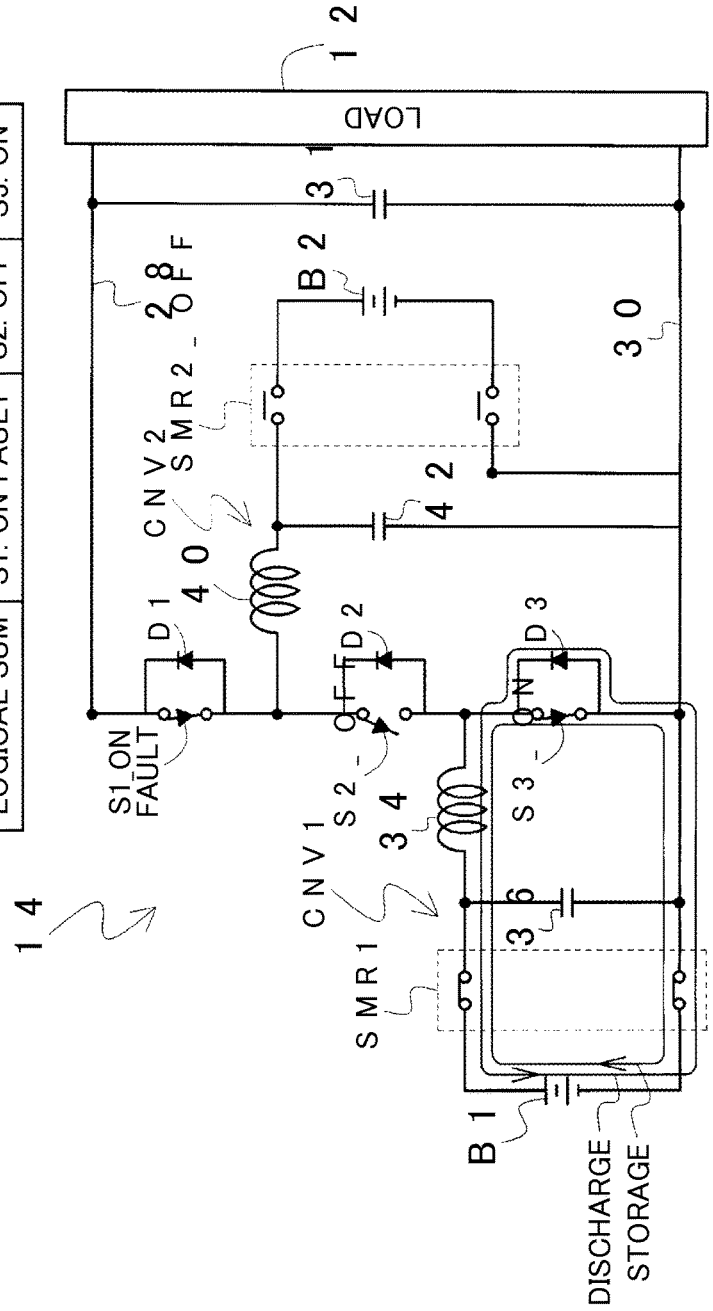
FIG. 22 is a view exemplifying an operation at the time of step-up storage and step-down discharge in a step-up/step-down mode in an ON fault of a switching element S1, among the step-up/step-down operations using the power supply system according to the another embodiment.

An operation of the voltage transducer 14 at the time when the switching element S1 has an ON fault (short-circuit fault) is described with reference to FIGS. 22, 23. As illustrated in FIG. 22, at the time of an ON fault of the switching element S1 (an ON fault of the S1-arm), an upper arm, viewed from the second buck-boost circuit CNV2, has an ON fault, so that a step-up/step-down operation using the circuit CNV2 cannot be performed. In view of this, the controlling portion 18 performs the following switch control as a first failsafe mode. That is, the controlling portion 18 turns off the system main relay SMR2 (contact opening) so as to separate the second battery B2 from the voltage transducer 14, thereby stopping an operation of the second buck-boost circuit CNV2. Further, a step-up/step-down operation is performed by the first buck-boost circuit CNV1.

FIG. 22 illustrates an operation at the time of step-up storage and at the time of step-down discharge, when the switching element S1 has an ON fault. At the time of step-up storage and at the time of step-down discharge, an upper arm is turned off and a lower arm is turned on. That is, in the first buck-boost circuit CNV1 (the S1-arm has an ON fault), the S2-arm is turned off and the S3-arm is turned on. In the meantime, since the second buck-boost circuit CNV2 stops its operation, an operation of the first buck-boost circuit CNV1 is just reflected as a logical sum.

Figure 23:
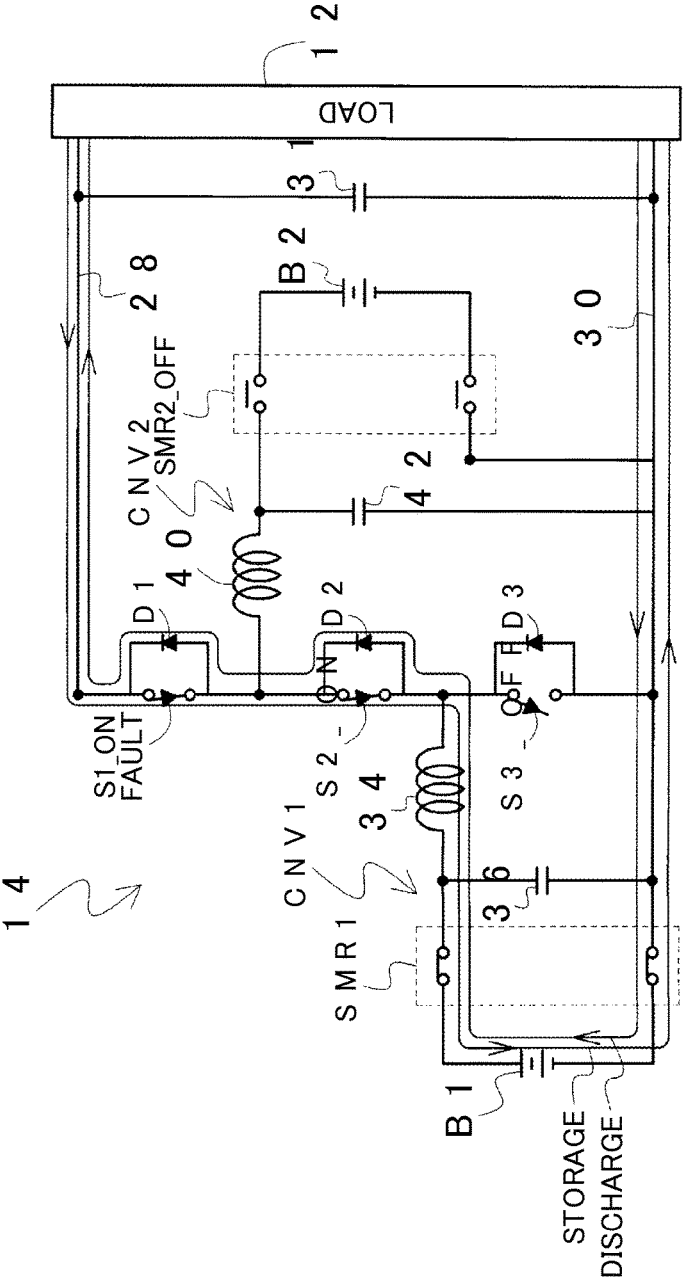
FIG. 23 is a view exemplifying an operation at the time of step-up discharge and step-down storage in the step-up/step-down mode in the ON fault of the switching element S1, among the step-up/step-down operations using the power supply system according to the another embodiment.

FIG. 23 illustrates an operation at the time of step-up discharge and at the time of step-down storage, when the switching element S1 has an ON fault. At the time of step-up discharge and at the time of step-down storage, an upper arm is turned on and a lower arm is turned off. That is, in the first buck-boost circuit CNV1 (the S1-arm has an ON fault), the S2-arm is turned on and the S3-arm is turned off.

An operation at the time of an ON fault of the switching element S2 is the same as the parallel step-up/step-down operation (FIGS. 20, 21) in a normal time in which the switching element S2 is turned on continuously. That is, fields for S2 in an upper table in FIGS. 20, 21 are replaced with "S2: ON fault," so that an operation at the time of an ON fault of the switching element S2 is obtained. In view of this, illustration and detailed descriptions thereof are omitted herein.

An operation of the voltage transducer 14 at the time when the switching element S3 has an ON fault is described with reference to FIGS. 24, 25. As illustrated in these figures, at the time of an ON fault of the switching element S3 (an ON fault of the S3-arm), a lower arm, viewed from the first buck-boost circuit CNV1, has an ON fault, so that a step-up/step-down operation using the circuit CNV1 cannot be performed. In view of this, the controlling portion 18 performs the following switch control as a second failsafe mode. That is, the controlling portion 18 turns off the system main relay SMR1 so as to separate the first battery B1 from the voltage transducer 14, thereby stopping an operation of the first buck-boost circuit CNV1. Further, a step-up/step-down operation is performed by the second buck-boost circuit CNV2.

Figure 24:
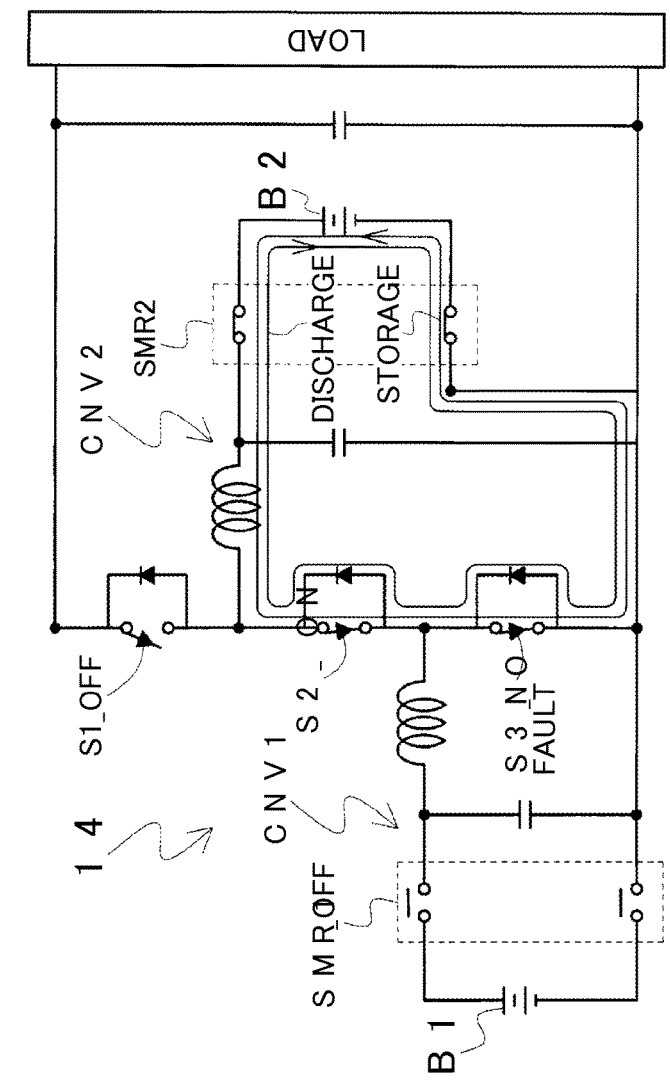
FIG. 24 is a view exemplifying an operation at the time of step-up storage and step-down discharge in a step-up/step-down mode in an ON fault of a switching element S3, among the step-up/step-down operations using the power supply system according to the another embodiment.

FIG. 24 illustrates an operation at the time of step-up storage and at the time of step-down discharge, when the switching element S3 has an ON fault. At the time of step-up storage and at the time of step-down discharge, an upper arm is turned off and a lower arm is turned on. That is, in the second buck-boost circuit CNV2, the S1-arm is turned off, and the S2-arm is turned on (the S3-arm has an ON fault). In the meantime, since the first buck-boost circuit CNV1 stops its operation, an operation of the second buck-boost circuit CNV2 is just reflected as a logical sum.

Figure 25:
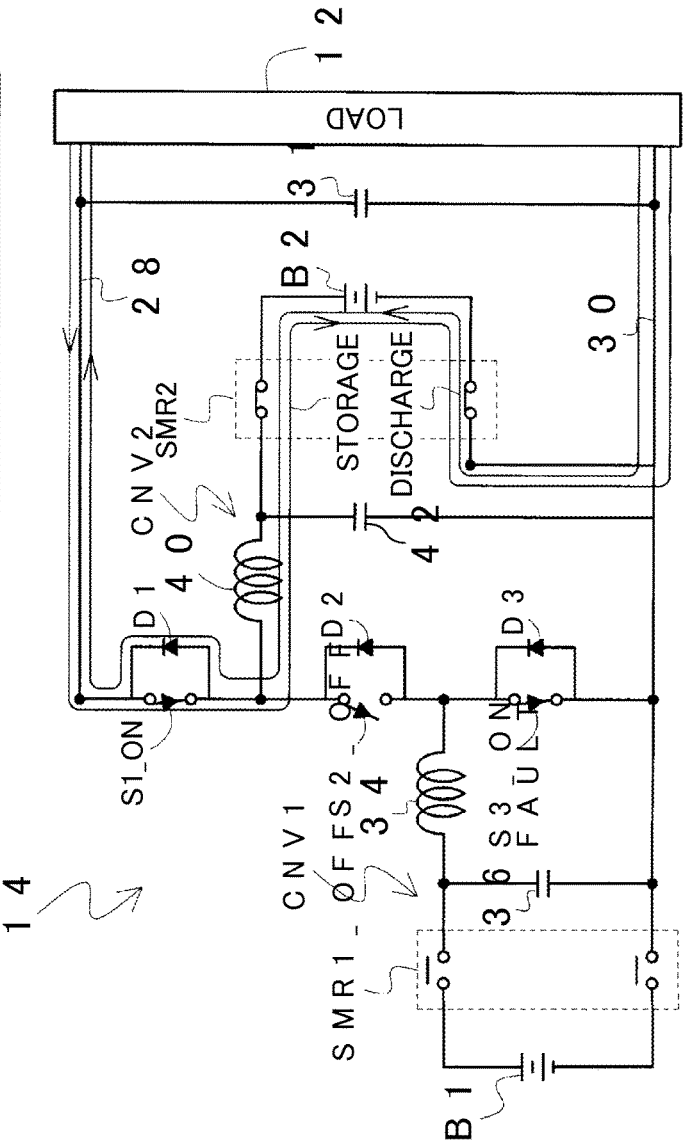
FIG. 25 is a view exemplifying an operation at the time of step-up discharge and step-down storage in the step-up/step-down mode in the ON fault of the switching element S3, among the step-up/step-down operations using the power supply system according to the another embodiment.

FIG. 25 illustrates an operation at the time of step-up discharge and at the time of step-down storage, when the switching element S3 has an ON fault. At the time of step-up discharge and at the time of step-down storage, an upper arm is turned on and a lower arm is turned off. That is, in the second buck-boost circuit CNV2, the S1-arm is turned on, and the S2-arm is turned off (the S3-arm has an ON fault).

As illustrated in FIGS. 22 to 25, at the time when the S1-arm or the S3-arm have an ON fault, the S2-arm is controlled to be ON/OFF instead of the arm thus having an ON fault. Hereby, at least one of two buck-boost circuits CNV1, CNV2 is usable, which makes it possible to perform a step-up/step-down operation at the time of an ON fault of a switching element, which cannot be performed in the related art.

Figure 26:
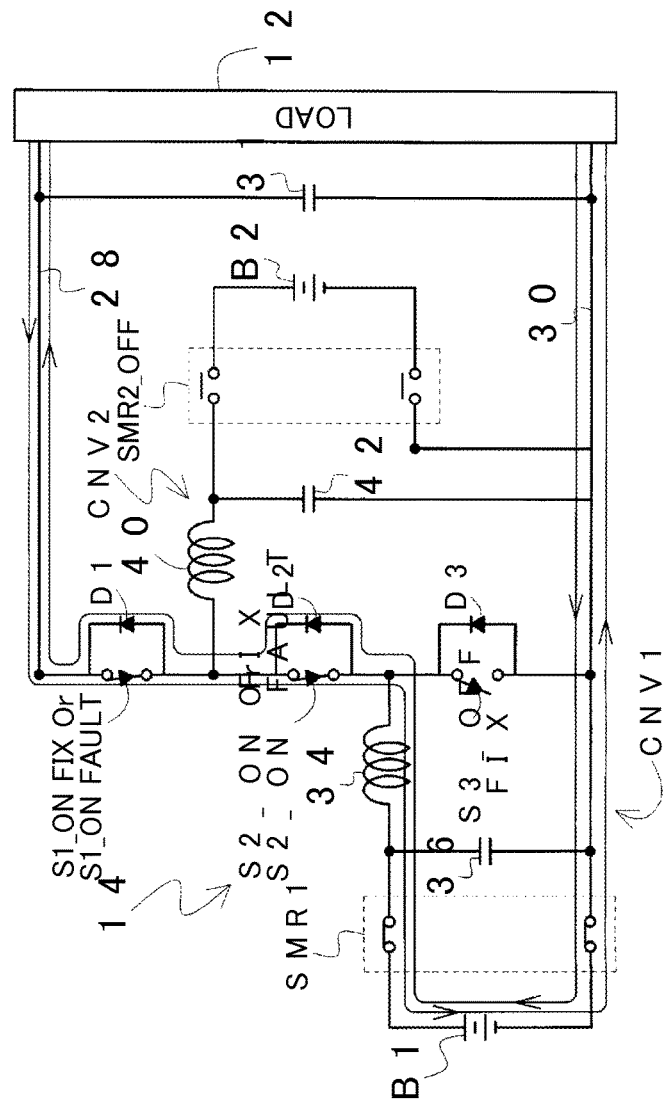
FIG. 26 is a view exemplifying an operation in a B1 single direct connection mode using the power supply system according to the another embodiment.

FIG. 26 illustrates an operation at the time when the first battery B1 singularly supplies an electric power to a load without performing a step-up/step-down operation. As described above, in this case, the first buck-boost circuit CNV1 and the second buck-boost circuit CNV2 may not become equipotential, unlike the step-up/stepdown operation. In this case, an inter-battery current (current loop) via the S2-arm might occur between the first battery B1 and the second battery B2 depending on a potential difference. In view of this, in a B1 single direct connection mode, the controlling portion 18 turns off the system main relay SMR2 so as to separate the second battery B2 from the voltage transducer 14.

In the B1 single direct connection mode, only the operation of the first buck-boost circuit CNV1 at the time of step-up discharge in the parallel step-up/step-down operation in a normal time as illustrated in FIG. 21 is picked out and fixed. That is, in the B1 single direct connection mode, the S1-arm and the S2-arm are fixed to an ON state, and the S3-arm is fixed to an OFF state. Note that, in this mode, the S1-arm and the S2-arm are fixed to an ON state. Accordingly, even in a case where the S1-arm and the S2-arm have an ON fault, this mode can be used.

Figure 27:
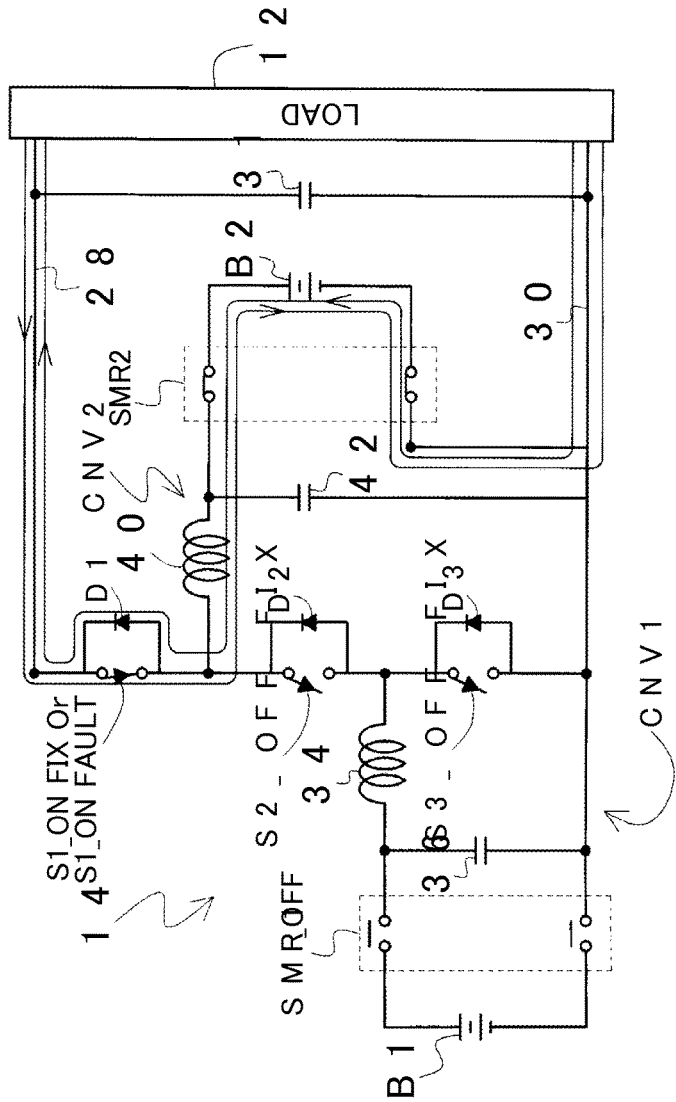
FIG. 27 is a view exemplifying an operation in a B2 single direct connection mode using the power supply system according to the another embodiment.

FIG. 27 illustrates an operation at the time when the second battery B2 singularly supplies an electric power to the load, instead of FIG. 26. In a B2 single direct connection mode, the controlling portion 18 turns off the system main relay SMR1 so as to separate the first battery B1 from the voltage transducer 14.

In the B2 single direct connection mode, only the operation of the second buck-boost circuit CNV2 at the time of step-up discharge in the parallel step-up/step-down operation in a normal time as illustrated in FIG. 21 is picked out and fixed. That is, in the B2 single direct connection mode, the S1-arm is fixed to an ON state, and the S2-arm and the S3-arm are fixed to an OFF state. Note that, in this mode, the S1-arm is fixed to an ON state. Accordingly, even in a case where the S1-arm has an ON fault, this mode can be used.

As described above, in the power supply system according to the present embodiment, an inter-battery current (current loop) via the S2-arm might occur between the first battery B1 and the second battery B2. In view of this, in the power supply system 10 according to the present embodiment, a second battery voltage VL2 is set higher than a first battery voltage VL1, thereby preventing the occurrence of the inter-battery current via a diode D2 of the S2-arm. If the switching element S2 is turned off in such a voltage relationship, it is possible to prevent the occurrence of the inter-battery current. That is, by controlling ON/OFF of the switching element S2, connection/disconnection between the first battery B1 and the second battery B2 can be controlled.

Further, at the time when the first battery B1 is charged from the second battery B2, a half-ON control is performed on the switching element S2 as mentioned earlier, so that a collector-emitter conduction resistance of the switching element S2 is adjusted, so as to control a charging current.

What is claimed is:

1. A power supply system comprising:
a first battery;
a second battery;
an output electric circuit configured to perform voltage conversion bidirectionally with either one or both of the first battery and the second battery, the output electric circuit including a first electric circuit and a second electric circuit, the second electric circuit having a potential lower than a potential of the first electric circuit;
a first switching element, a second switching element, and a third switching element provided in series with each other from the first electric circuit toward the second electric circuit, the first battery being provided in parallel with the second switching element, the second battery being provided in parallel with a series connection between the second switching element and the third switching element;
a first system main relay configured such that the first battery is connected in parallel with the second switching element via the first system main relay;
a second system main relay configured such that the second battery is connected in parallel with the series connection between the second switching element and the third switching element via the second system main relay; and
a controlling portion configured to perform ON-OFF controls on the first switching element, the second switching element, the third switching element, the first system main relay and the second system main relay, wherein
the controlling portion is configured to, at a time of an ON fault of the first switching element, turn off the second system main relay and execute a first failsafe mode by performing ON-OFF controls on the second switching element and the third switching element,
the controlling portion is configured to step up a voltage of the first battery in the first failsafe mode.

2. A power supply system comprising:
a first battery;
a second battery;
an output electric circuit configured to perform voltage conversion bidirectionally with either one or both of the first battery and the second battery, the output electric circuit including a first electric circuit and a second electric circuit, the second electric circuit having a potential lower than a potential of the first electric circuit;
a first switching element, a second switching element, and a third switching element provided in series with each other from the first electric circuit toward the second electric circuit, the first battery being provided in parallel with the second switching element, the second battery being provided in parallel with a series connection between the second switching element and the third switching element;
a first system main relay configured such that the first battery is connected in parallel with the second switching element via the first system main relay;
a second system main relay configured such that the second battery is connected in parallel with the series connection between the second switching element and the third switching element via the second system main relay; and
a controlling portion configured to perform ON-OFF controls on the first switching element, the second switching element, the third switching element, the first system main relay and the second system main relay, wherein
the controlling portion is configured to, at a time of an ON fault of the second switching element, turn off the first system main relay and execute a second failsafe mode by performing ON-OFF controls on the first switching element and the third switching element,
the controlling portion is configured to step up a voltage of the second battery in the second failsafe mode.

3. A power supply system comprising:
a first battery;
a second battery;
an output electric circuit configured to perform voltage conversion bidirectionally with either one or both of the first battery and the second battery, the output electric circuit including a first electric circuit and a second electric circuit, the second electric circuit having a potential lower than a potential of the first electric circuit; and
a first switching element, a second switching element, and a third switching element provided in series with each other from the first electric circuit toward the second electric circuit, the first battery being provided in parallel with the second switching element, the second battery being provided in parallel with a series connection between the second switching element and the third switching element, wherein
the second battery has a voltage higher than a voltage of the first battery,
the first battery and the second battery are placed in a loop circuit via the third switching element,
the controlling portion is configured to control connection or disconnection between the first battery and the second battery by performing an ON-OFF control on the third switching element, and wherein
the controlling portion is configured to control a charging current by adjusting a conduction resistance of the third switching element, when an electric power is supplied to the first battery from the second battery by connecting the first battery to the second battery.

* * * * *